United States Patent
Kwon et al.

(10) Patent No.: US 12,529,935 B2
(45) Date of Patent: Jan. 20, 2026

(54) REFLECTIVE DISPLAY USING COLOR CAPSULES AND MANUFACTURING METHOD THEREOF

(71) Applicant: KOREA ELECTRONICS TECHNOLOGY INSTITUTE, Seongnam-si (KR)

(72) Inventors: Soon Hyung Kwon, Seongnam-si (KR); Byung Wook Yoo, Seongnam-si (KR); Chul Jong Han, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 866 days.

(21) Appl. No.: 17/702,388

(22) Filed: Mar. 23, 2022

(65) Prior Publication Data

US 2022/0317350 A1     Oct. 6, 2022

(30) Foreign Application Priority Data

Mar. 30, 2021 (KR) ........................ 10-2021-0041396

(51) Int. Cl.
*G02B 5/20* (2006.01)
*G02B 5/26* (2006.01)
(Continued)

(52) U.S. Cl.
CPC ........ *G02F 1/1677* (2019.01); *G02F 1/16757* (2019.01); *G02F 1/1681* (2019.01); *G02B 5/206* (2013.01); *G02B 5/26* (2013.01)

(58) Field of Classification Search
CPC ........ G02B 5/206; G02B 5/26; G02B 26/007; G02B 26/026; G02F 1/1677;
(Continued)

(56) References Cited

U.S. PATENT DOCUMENTS

2003/0176557 A1*  9/2003  Liang ................. G02F 1/1341
                                                          524/474
2004/0263947 A1* 12/2004  Drzaic ................. H10K 19/00
                                                          359/296
(Continued)

FOREIGN PATENT DOCUMENTS

JP           2004-325632 A      11/2004
KR       10-2004-0083923 A      10/2004
(Continued)

OTHER PUBLICATIONS

Office Action issued on Aug. 31, 2022, for counterpart KR Patent application No. 10-2021-0041396.

*Primary Examiner* — Zachary W Wilkes
*Assistant Examiner* — Anna Smith
(74) *Attorney, Agent, or Firm* — Knobbe, Martens, Olson & Bear, LLP

(57) ABSTRACT

This application relates to a reflective display using color capsules and a method of manufacturing thereof. In one aspect, the method includes preparing a substrate in which first, second, and third receiving portions respectively having first, second, and third widths are formed by forming separating portions on a first substrate and forming the color capsules in which first, second, and third color capsules respectively having first, second, and third diameters are formed. The method may also include disposing the color capsule in which the first, second, and third color capsules are respectively inserted into the first, second, and third receiving portions, wherein the first, second, and third diameters respectively correspond to the first, second, and third widths. The color capsules are respectively inserted into receiving portions having the corresponding diameters, so that the reflective display which is convenient to manu- (Continued)

facture and which has a multi-color pixel region may be provided.

7 Claims, 18 Drawing Sheets

(51) Int. Cl.
*G02F 1/16757* (2019.01)
*G02F 1/1677* (2019.01)
*G02F 1/1681* (2019.01)

(58) Field of Classification Search
CPC .......... G02F 1/133621; G02F 1/16757; G02F 1/1681; G02F 2001/1678; G02F 2203/055; G02F 2203/34
See application file for complete search history.

(56) References Cited

U.S. PATENT DOCUMENTS

| | | | | |
|---|---|---|---|---|
| 2005/0122564 | A1* | 6/2005 | Zehner | G06F 3/147 359/296 |
| 2008/0100907 | A1* | 5/2008 | Lipovetskaya | G02B 26/026 137/13 |
| 2009/0244688 | A1* | 10/2009 | Fujiwara | G02F 1/167 445/24 |
| 2012/0194894 | A1* | 8/2012 | Yashiro | C09K 9/02 546/256 |
| 2018/0157144 | A1* | 6/2018 | Sadlik | G02F 1/195 |

FOREIGN PATENT DOCUMENTS

| | | |
|---|---|---|
| KR | 10-2011-0112144 A | 10/2011 |
| KR | 10-1203477 B1 | 11/2012 |

* cited by examiner

REFLECTIVE DISPLAY USING COLOR CAPSULES AND MANUFACTURING METHOD THEREOF

CROSS REFERENCE TO RELATED APPLICATION

The present application claims priority to Korean Patent Application No. 10-2021-0041396, filed Mar. 30, 2021, the entire contents of which are incorporated herein for all purposes by this reference.

BACKGROUND

Technical Field

The present disclosure relates to a reflective display using color capsules and to a method of manufacturing thereof.

Description of Related Technology

When an image is formed on a screen of a reflective display, the reflective display can maintain the image even if power is not continuously supplied. Further, since the reflective display uses reflection of external light, a backlight is unnecessary and power consumption is low.

SUMMARY

Accordingly, the present disclosure has been made keeping in mind the above problems occurring in the related art, and an objective of the present disclosure is to provide a reflective display in which color capsules including color particles are disposed according to colors.

In addition, another objective of the present disclosure is to provide a method of manufacturing the reflective display in which the reflective display is manufactured by disposing the color capsules according to the colors and diameters of the color capsules are differently formed according to the colors such that a specific color is controlled to be positioned at a specific position.

In a reflective display using color capsules according to an embodiment of the present disclosure, the reflective display may include: a first substrate; separating portions formed on the first substrate such that a plurality of receiving portions is divided, the separating portions being configured to divide respective widths of the plurality of receiving portions differently according to respective colors of sub-pixel regions; and the color capsules which are formed with respective diameters corresponding to the respective widths of the plurality of receiving portions according to the respective colors of the sub-pixel regions and which are respectively stored in the plurality of receiving portions, the color capsules having particles that have respective colors corresponding to the respective colors of the sub-pixel regions.

In addition, the plurality of receiving portions may include: a first receiving portion which is positioned so as to correspond to a first sub-pixel region having a first color and which is formed with a first width; a second receiving portion which is positioned so as to correspond to a second sub-pixel region having a second color and which is formed with a second width; and a third receiving portion which is positioned so as to correspond to a third sub-pixel region having a third color and which is formed with a third width.

In addition, the color capsules may include: a first color capsule which is stored in the first receiving portion and which is formed with a first diameter that corresponds to the first width, the first color capsule including a particle having the first color; a second color capsule which is stored in the second receiving portion and which is formed with a second diameter that corresponds to the second width, the second color capsule including a particle having the second color; and a third color capsule which is stored in the third receiving portion and which is formed with a third diameter that corresponds to the third width, the third color capsule including a particle having the third color.

In addition, in the reflective display using the color capsules, when the first width is the largest and the third width is the smallest among the first width, the second width, and the third width, the reflective display may further include: a second spacer formed on a lower end of the second receiving portion so as to support the second color capsule such that the second color capsule is positioned on an upper side of the second receiving portion; and a third spacer formed on a lower end of the third receiving portion so as to support the third color capsule such that the third color capsule is positioned on an upper side of the third receiving portion.

In addition, the first receiving portion, the second receiving portion, and the third receiving portion may be formed in a rectilinear shape and may be arranged side by side, and the first receiving portion, the second receiving portion, and the third receiving portion may be repetitively and sequentially disposed in a width direction.

In addition, each width of the sub-pixel regions may be the same, the first receiving portion, the second receiving portion, and the third receiving portion may be formed in a rectilinear shape and may be arranged side by side, and the first receiving portion having the first width that corresponds to the sub-pixel region having the first color, at least two second receiving portions which are included in the sub-pixel region having the second color and which are formed with the second width that is smaller than the first width, and at least three third receiving portions which are included in the sub-pixel region having the third color and which are formed with the third width that is smaller than the second width may be repetitively and sequentially disposed in a width direction.

In addition, the first receiving portion, the second receiving portion, and the third receiving portion may be formed in a zigzag shape and may be arranged side by side, and the first receiving portion, the second receiving portion, and the third receiving portion may be repetitively and sequentially disposed in a width direction.

In addition, the first receiving portion, the second receiving portion, and the third receiving portion may be formed in a rectilinear shape and may be arranged side by side, the first receiving portion having the first width that corresponds to the sub-pixel region having the first color, the second receiving portion formed with the second width which corresponds to the sub-pixel region having the second color and which is the same as the first width, and the third receiving portion formed with the third width which corresponds to the sub-pixel region having the third color and which is the same as the second width may be sequentially and repetitively disposed in a width direction, and the first width, the second width, and the third width may be the same.

In addition, the first receiving portion, the second receiving portion, and the third receiving portion may be formed in a lattice shape in which a length thereof is a multiple of a width thereof, the first receiving portion, the second receiving portion, and the third receiving portion may be repetitively and sequentially disposed in a width direction, and the first receiving portion including a plurality of first receiving portions, the second receiving portion including a plurality of second receiving portions, and the third receiving portion including a plurality of third receiving portions may be disposed in length directions thereof.

In addition, the separating portions may be formed of a plurality of pillars disposed at a distance smaller than the respective diameters of the color capsules.

In addition, in a method of manufacturing a reflective display using color capsule, the method may include: preparing a substrate in which a first receiving portion having a first width, a second receiving portion having a second width, a third receiving portion having a third width are formed by forming separating portions on a first substrate; forming the color capsules in which a first color capsule having a first diameter, a second color capsule having a second diameter, and a third color capsule having a third diameter are formed; and disposing the color capsules in which the first color capsule is inserted into the first receiving portion, the second color capsule is inserted into the second receiving portion, and the third color capsule is inserted into the third receiving portion. At this time, the first diameter may correspond to the first width, the second diameter may correspond to the second width, and the third diameter may correspond to the third width.

In addition, in the disposing process of the color capsules, the first color capsule having the first diameter may be output to the first receiving portion having the first width by a first nozzle, the second color capsule having the second diameter may be output to the second receiving portion having the second width by a second nozzle, and the third color capsule having the third diameter may be output to the third receiving portion having the third width by a third nozzle.

In addition, in the preparing of the substrate, the first receiving portion having the first width, the second receiving portion having the second width, and the third receiving portion having the third width may be formed by forming the separating portions between the first substrate and a second substrate that is spaced apart in a direction toward an upper surface of the first substrate during the preparing of the substrate.

In addition, the disposing process of the color capsules may include: injecting the first color capsule through an inlet port such that the first color capsule having the first diameter is inserted into the first receiving portion having the first width; injecting the second color capsule through the inlet port such that the second color capsule having the second diameter is inserted into the second receiving portion having the second width; and injecting the third color capsule through the inlet port such that the third color capsule having the third diameter is inserted into the third receiving portion having the third width. At this time, the first diameter may be the largest and the third diameter may be the smallest among the first diameter, the second diameter, and the third diameter.

In addition, in the preparing of the substrate, the first receiving portion provided with a first entrance having the first width, the second receiving portion provided with a second entrance having the second width, and the third receiving portion provided with a third entrance having the third width may be formed by forming the separating portions between the first substrate and the second substrate that is spaced apart in the direction toward the upper surface of the first substrate, and the first width of the first receiving portion, the second width of the second receiving portion, and the third width of the third receiving portion may be the same.

In addition, in the preparing of the substrate, a first exit having a width smaller than the first diameter may be further formed at opposite side of the first entrance of the first receiving portion, a second exit having a width smaller than the second diameter may be further formed at opposite side of the second entrance of the second receiving portion, and a third exit having a width smaller than the third diameter may be further formed at opposite side of the third entrance of the third receiving portion.

In addition, in the preparing of the substrate, the inlet port and an outlet port may be formed for each width of a pixel region including the first receiving portion, the second receiving portion, and the third receiving portion.

The features and advantages of the present disclosure will be more clearly understood from the following detailed description based on the accompanying drawings.

The terms and words used in the present specification and claims should not be interpreted as being limited to typical meanings and dictionary definitions, but should be interpreted as having meanings and concepts relevant to the technical scope of the present disclosure based on the rule according to which an inventor can appropriately define the concept of the term to describe most appropriately the best method he or she knows for carrying out the present disclosure.

According to an embodiment of the present disclosure, by disposing the color capsules including the color particles according to the colors, various colors can be displayed without using a color filter, and the reflective display without a decrease in brightness can be provided.

In addition, according to an embodiment of the present disclosure, since a specific color is controlled to be positioned at a specific position by varying the diameters of the color capsules, the color capsules can be efficiently disposed at the correct position according to the colors.

BRIEF DESCRIPTION OF THE DRAWINGS

The above and other objectives, features, and other advantages of the present disclosure will be more clearly understood from the following detailed description when taken in conjunction with the accompanying drawings.

DETAILED DESCRIPTION

Figure 1:
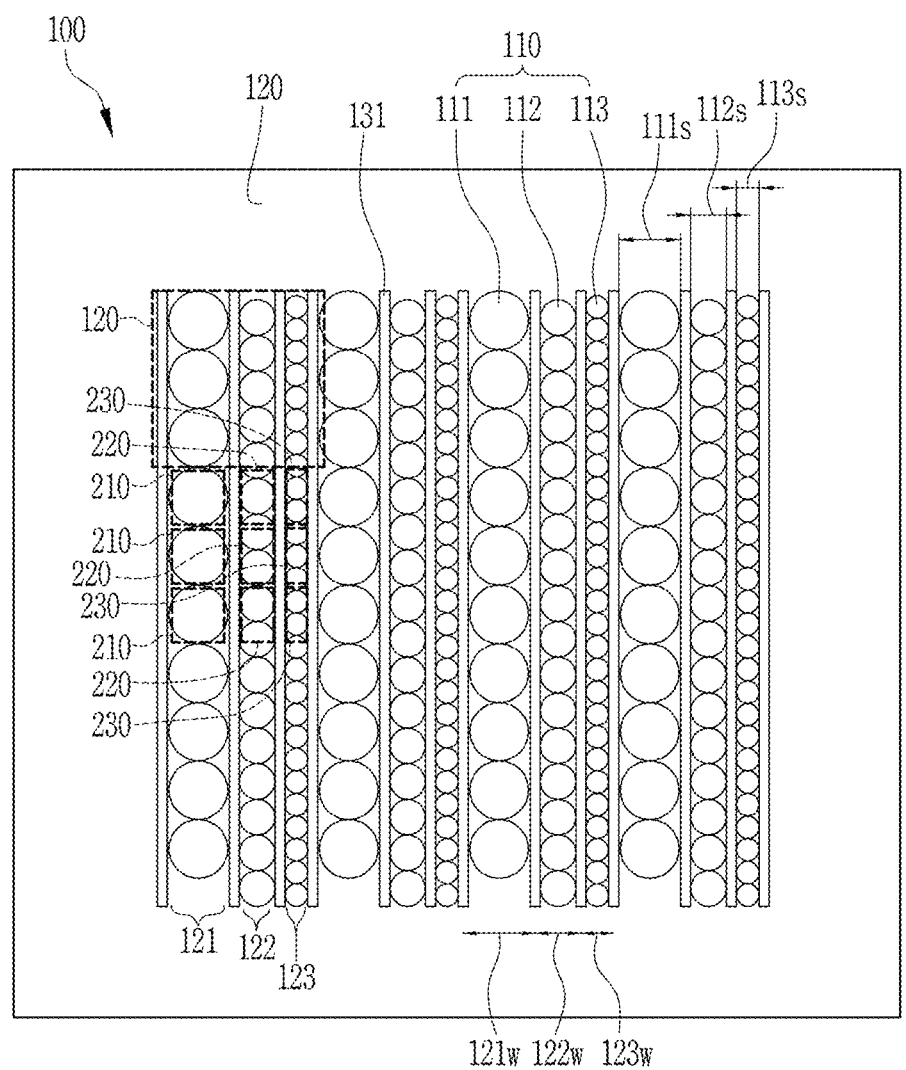
FIG. 1 is a view illustrating a plan layout of a reflective display using color capsules according to an embodiment of the present disclosure.

Despite these advantages, the reflective display is not available for a wide variety of applications because the reflective display is effective in providing black and white images but there is a problem that brightness of the reflective display is reduced when various colors are displayed. When a color filter is used in a black and white reflective display, the color filter absorbs some of the external light, so that the problem that the brightness is reduced occurs. In order to solve this problem, a reflective display using particles having colors without using the color filter has been researched, but it is difficult to arrange the particles having the colors on the correct position.

The objectives, features, and advantages of the present disclosure will be more clearly understood from the following detailed description of the preferred embodiments associated with the accompanying drawings. In the specification, in adding reference numerals for elements in each drawing, it should be noted that like reference numerals already used to denote like elements in other drawings are used for elements wherever possible. Further, the terms "one side", "another side", "first", "second", and the like are used to distinguish one element from other elements, but the elements should not be construed to be limited by the terms. Hereinafter, in the description, details of well-known features and techniques may be omitted to avoid unnecessarily obscuring the presented embodiments.

Hereinafter, an embodiment of the present disclosure will be described in detail with reference to the accompanying drawings.

FIG. 1 is a view illustrating a plan layout of a reflective display 100 using color capsules according to an embodiment of the present disclosure.

According to the present disclosure, the reflective display 100 using the color capsules may include a first substrate 120, a separating portion 131 formed on the first substrate 120 so as to divide a plurality of receiving portions, the separating portion 131 dividing widths of the plurality of receiving portions differently according to colors of sub-pixel regions, and the plurality of color capsules 110 having diameters thereof respectively corresponding to the widths of the plurality of receiving portions according to the colors of the sub-pixel regions, the plurality of color capsules 110 being stored in the plurality of receiving portions, and the plurality of color capsules 110 respectively having particles that have colors corresponding to the colors of the sub-pixel regions.

The first substrate 120 supports the reflective display 100. Generally, as a material of the first substrate 120, a material used in the reflective display 100 may be used. The separating portion 131 is a wall formed on the first substrate 120. Generally, as a material of the separating portion 131, a material used in the reflective display 100 may be used. The separating portion 131 may include the plurality of separating portions 131. The receiving portion is a space formed between the separating portion 131 and the adjacent separating portion 131. The receiving portion may include a first receiving portion 121, a second receiving portion 122, and a third receiving portion 123. A color of a first color capsule 111, a color of a second color capsule 112, and a color of a third color capsule 113 may be different from each other. The different colors of the color capsules 110 means that the colors of at least some of the color particles included in the color capsules 110 are different.

The first receiving portion 121, the second receiving portion 122, and the third receiving portion 123 may be formed in a rectilinear shape and may be arranged side by side, and may be sequentially and repetitively arranged in a width direction. Similarly, a plurality of first sub-pixel regions 210, a plurality of second sub-pixel regions 220, and a plurality of third sub-pixel regions 230 may be formed in the rectilinear shape and may be arranged side by side, and may be arranged sequentially and repetitively in the width direction.

A pixel region 200 includes a plurality of sub-pixel regions. As illustrated in FIG. 1, the pixel region 200 may include three first sub-pixel regions 210, three second sub-pixel regions 220, and three third sub-pixel regions 230. The number and arrangement of the sub-pixel regions included in the pixel region 200 may be changed. The sub-pixel region is determined to control the color of one type of the color capsule 110. The first receiving portion 121 is arranged so as to correspond to the first sub-pixel region 210, the second receiving portion 122 is arranged so as to correspond to the second sub-pixel region 220, and the third receiving portion 123 is arranged so as to correspond to the third sub-pixel region 230.

The present specification, it is assumed that the pixel region 200 is an RGB multicolor pixel, the first sub-pixel region 210 shows a red color, the second sub-pixel region 220 shows a green color, and the third sub-pixel region 230 shows a blue color as a default. In addition, the color capsule 110 capable of showing the color of the sub-pixel region may be disposed in the sub-pixel region. In the scope of the present disclosure, it is obvious that changes such as selecting of another color as a color of the sub-pixel region, further using of a fourth sub-pixel region, and so on are included.

The receiving portion may include the first receiving portion 121 which is positioned so as to correspond to the first sub-pixel region 210 of a first color and which is formed with a first width 121w, the second receiving portion 122 which is positioned so as to correspond to the second sub-pixel region 220 of a second color and which is formed with a second width 122w, and the third receiving portion 123 which is positioned so as to correspond to the third sub-pixel region 230 of a third color and which is formed with a third width 123w. The first color may be red, the second color may be green, and the third color may be blue.

The diameter of the color capsule 110 refers to a size of the color capsule 110. The color capsule 110 may be formed with a diameter of several micrometers (μm), several tens of micrometers (μm), or several hundreds of micrometers (μm). The color capsule 110 may include the first color capsule 111 stored in the first receiving portion 121 and formed with a first diameter 111s that corresponds to the first width 121w, the first color capsule 111 including the particle of the first color, the second color capsule 112 stored in the second receiving portion 122 and formed with a second diameter 112s that corresponds to second width 122w, the second color capsule 112 including the particle of the second color, and the third color capsule 113 stored in the third receiving portion 123 and formed with a third diameter 113s that corresponds to the third width 123w, the third color capsule 113 including the particle of the third color.

The first color capsule 111 having the first color is disposed on the first receiving portion 121 that corresponds to the first sub-pixel region 210, the second color capsule 112 having the second color is disposed on the second receiving portion 122 that corresponds to the second sub-pixel region 220, and the third color capsule 113 having the third color is disposed on the third receiving portion 123 that corresponds to the third sub-pixel region 230. Accordingly, multiple colors may be displayed in the single pixel region 200. Since the first width 121w of the first receiving portion 121 and the first diameter 111s of the first color capsule 111 are corresponding to each other, the first color capsule 111 can be inserted into the first receiving portion 121. Since the second width 122w of the second receiving portion 122 and the second diameter 112s of the second color capsule 112 are corresponding to each other, the second color capsule 112 can be inserted into the second receiving portion 122. Since the third width 123w of the third receiving portion 123 and the third diameter 113s of the third color capsule 113 are corresponding to each other, the third color capsule 113 can be inserted into the third receiving portion 123.

Figure 2:
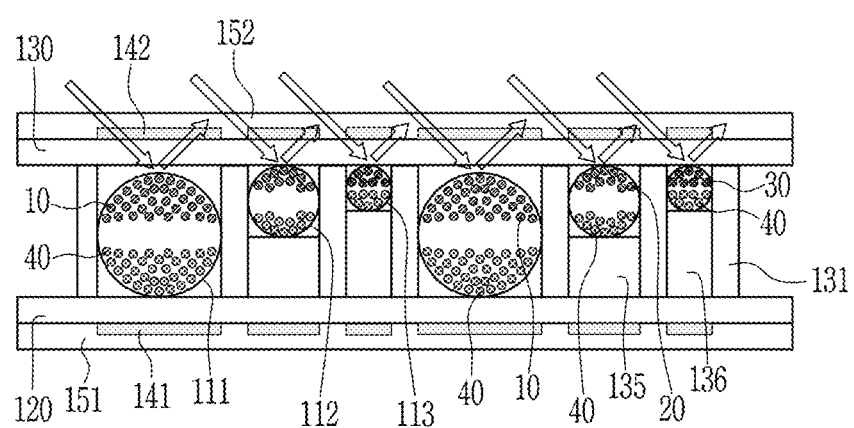
FIG. 2 is a view illustrating a side surface of the reflective display using the color capsules according to an embodiment of the present disclosure.

FIG. 2 is a view illustrating a side surface of the reflective display 100 using the color capsules according to an embodiment of the present disclosure.

The color capsule 110 may include a solvent 50 and some of a plurality of first color particles 10, a plurality of second color particles 20, a plurality of third color particles 30, and a plurality of fourth color particles 40. Each of the color particles included in the color capsule 110 may respectively include a pigment of a predetermined color. The first color capsule 111 may include the solvent 50, the plurality of first color particles 10, and the plurality of fourth color particles 40. The second color capsule 112 may include the solvent 50, the plurality of second color particles 20, and the plurality of fourth color particles 40. The third color capsule 113 may include the solvent 50, the plurality of third color particles 30, and the plurality of fourth color particles 40. The plurality of first color particles 10 may include a red pigment, the plurality of second color particles 20 may include a green pigment, and the plurality of third color particles 30 may include a blue pigment. A pigment having a color may be included in the solvent 50. Each of the color particles 10, 20, 30, and 40 may have an electric charge. For example, the first color particle 10, the second color particle 20, and the third color particle 30 may have a positive electric charge, and the fourth color particle 40 may have a negative electric charge.

When an electric field is formed in a specific direction by a first electrode layer 141 positioned on a lower side of the color capsule 110 and a second electrode layer 142 positioned on an upper side of the color capsule 110, the color particles move to the upper side of the color capsule 110 or move to the lower side of the color capsule 110 according to the charge. Which color particles are positioned on the upper side of the color capsule 110 can be controlled by a direction of the electric field, intensity of the electric field, and duration of the electric field. External light is reflected by the color particles clustered on the upper side of the color capsule 110, so that the color is expressed. For example, in the first color capsule 111, when the first color particles 10 are moved to the upper side, light introduced from outside is reflected by the first color particles 10, and only a red wavelength is reflected, so that red color is displayed.

At least three types of color particles may be included in the color capsule 110. Each of the color particles may have different diameters or different masses according to the color. When the diameter and the mass of each of the color particles are different, moving speeds of each of the particles in liquid are different. Therefore, by adjusting the intensity of the electric field or by adjusting the duration of the electric field, each of the color particles can be moved individually according to the color. When at least three types of color particles are included in the single color capsule 110, each moving speed of at least three types of color particles according to the electric field can be adjusted by adjusting the charge, the diameter, and the mass of each of the color particles, and at least three types of different colors can be displayed.

an outer wall of the color capsule 110 may be formed of an elastic and transparent material. The outer wall of the color capsule 110 may be formed of a light-transmissive polymeric material, and may include at least one or a combination of acacia gum, alginate, gelatin, ethyl cellulose, polyamide, melamine formaldehyde, poly(vinyl pyridine), polystyrene, urethane, polyurethane, and methyl methacrylate.

Among the first width 121w of the first receiving portion 121, the second width 122w of the second receiving portion 122, and the third width 123w of the third receiving portion 123, when the first width 121w is the largest and the third width 123w is the smallest, the reflective display 100 using the color capsule 110 may further include a second spacer 135 formed on a lower end of the second receiving portion 122 so as to support the second color capsule 112 such that the second color capsule 112 is positioned on an upper side of the second receiving portion 122, and may further include a third spacer 136 formed on a lower end of the third receiving portion 123 so as to support the third color capsule 113 such that the third color capsule 113 is positioned on an upper side of the third receiving portion 123. The first receiving portion 121 may further include a first spacer (not illustrated).

The reflective display 100 displays colors by reflecting light incident from a direction toward a second substrate 130, so that the color capsule 110 that displays the color is required to be uniformly positioned on the upper side of the receiving portion. It is preferable that the color capsule 110 is configured in a single layer type that does not overlap each other up and down. A height 131h of the receiving portion is formed to correspond to the first diameter 111s of the first color capsule 111 that has the largest size. When second spacer 135 is not provided and the lower side of the second receiving portion 122 is not filled, the second color capsule 112 is not positioned on the upper side of the second receiving portion 122, and the second color capsule 112 is accommodated in two or more layers in the second receiving portion 122, so that a problem that the second color capsule 112 is not uniformly filled on the upper side of the second receiving portion 122 occurs.

A value obtained by subtracting the second diameter 112s of the second color capsule 112 from the height of the second receiving portion 122 may be determined as a second height 135h of the second spacer 135. A value obtained by subtracting the third diameter 113s of the third color capsule 113 from the height of the third receiving portion 122 may be determined as a third height 136h of the third spacer 135. When the second spacer 135 fills the lower side of the second receiving portion 122 and the third spacer 136 fills the lower side of the third receiving portion 123, the second color capsule 112 and the third color capsule 113 may be uniformly disposed on the upper side of the receiving portion. Therefore, regardless of the diameter of each color capsule, since light incident from the outside is reflected on the same plane, the performance of the display may be improved.

The second substrate 130 may be disposed on the upper portion of the receiving portion. The receiving portion is divided by the first substrate 120, the second substrate 130, and the separating portion 131. The first electrode layer 141 may be formed on a lower surface of the first substrate 120, and the second electrode layer 142 may be formed on an upper surface of the second substrate 130. A first protective layer 151 may be formed on a lower surface of the first electrode layer 141, and a second protective layer 152 may be formed on an upper surface of the second electrode layer 142. The first electrode layer 141 and the second electrode layer 142 include a plurality of electrodes controlling the sub-pixel region. The first electrode layer 141 and the second electrode layer 142 may be formed to be operated in various methods such as a segment controlling method, a Passive Matrix (PM) controlling method, an Active Matrix (AM) controlling method, and the like. The first electrode layer 141 and the second electrode layer 142 forms electric fields in different directions for each sub-pixel region by using electrodes that correspond to the respective sub-pixel regions, so that the movement of the particles inside the color capsule 110 can be controlled.

Otherwise, the first electrode layer 141 may be formed on an upper surface of the first substrate 120, and the second electrode layer 142 may be formed on a lower surface of the second substrate 130.

Figure 3:
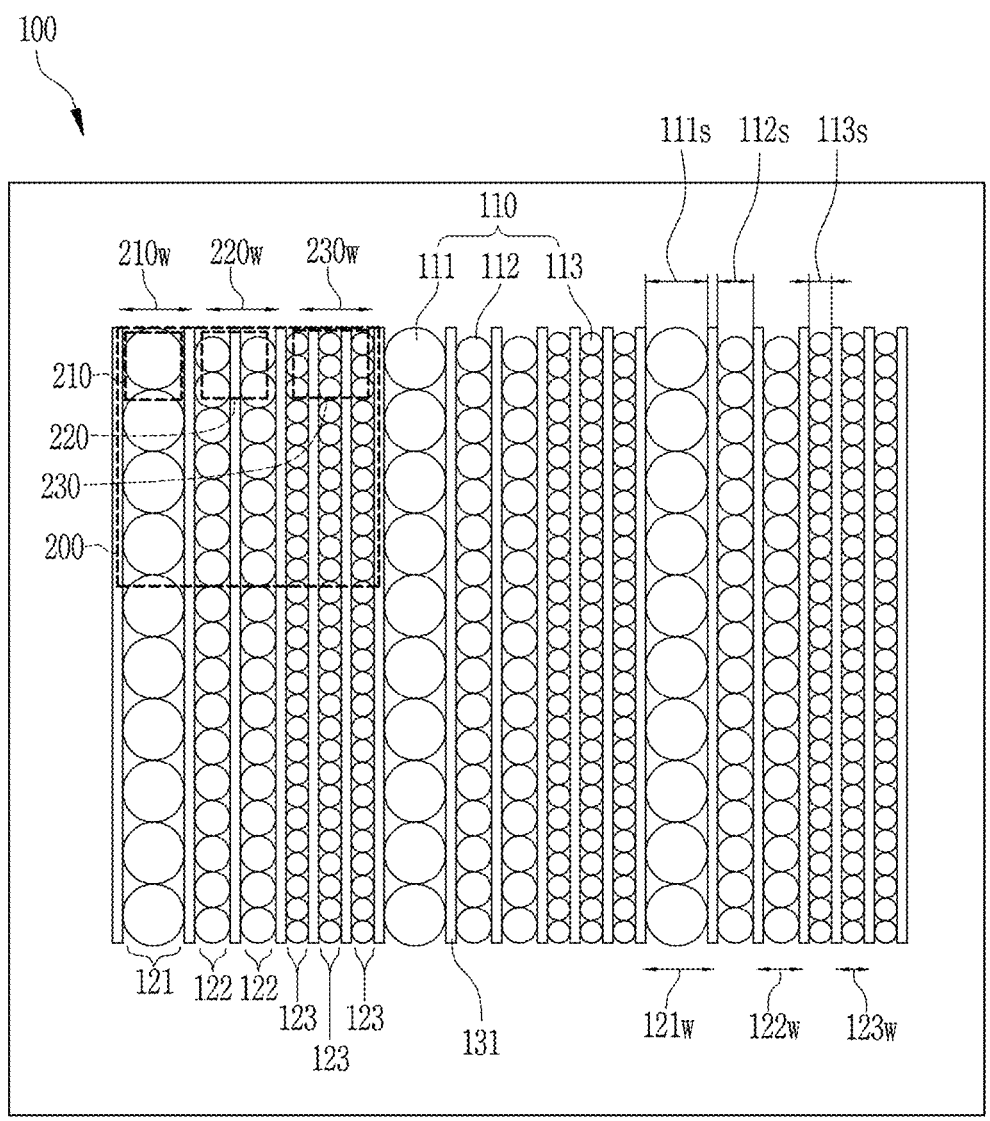
FIG. 3 is a view illustrating a layout in which widths of sub-pixel regions of the reflective display using the color capsules according to an embodiment of the present disclosure are the same.

FIG. 3 is a view illustrating a layout in which first, second, and third sub-pixel region widths 210w, 220w, and 230w of the reflective display 100 using the color capsules according to an embodiment of the present disclosure are the same.

As illustrated in FIG. 3, the first, second, and third sub-pixel region widths 210w, 220w, and 230w may be formed to be the same. Since the first, second, and third sub-pixel region widths 210w, 220w, and 230w are formed to be the same, the color that can be displayed in the single pixel region 200 can be controlled efficiently and easily. When the first, second, and third sub-pixel region widths 210w, 220w, and 230w are formed to be the same, the first, second, and third sub-pixel region widths 210w, 220w, and 230w and the first, second, and third widths 121w, 122w, and 123w of the receiving portion may be formed differently.

The first receiving portion 121, the second receiving portion 122, and the third receiving portion 123 are formed in the rectilinear shape and are arranged side by side. Further, the first receiving portion 121, the second receiving portion 122, and the third receiving portion 123 may be arranged such that the first receiving portion 121 having the first width 121w that corresponds to the sub-pixel region of the first color, at least two second receiving portions 122 included in the sub-pixel region of the second color and each having the second width 122w that is smaller than the first width 121w, and at least three third receiving portions 123 included in the sub-pixel region of the third color and each having the third width 123w that is smaller than the second width 122w are repetitively and sequentially disposed in the width direction.

For example, the first width 121w of the first receiving portion 121, the first diameter 111s of the first color capsule 111, and the first sub-pixel region width 210w of the first sub-pixel region 210 may be formed to correspond to each other. That is, single first receiving portion 121 may be disposed in the first sub-pixel region 210, and single first color capsule 111 may be stored in the first receiving portion 121. In addition, the first sub-pixel region width 210w of the first sub-pixel region 210 and the second sub-pixel width 220w of the second sub-pixel region 220 are the same, the second diameter 112s of the second color capsule 112 is smaller than the first diameter 111s of the first color capsule 111, and the second width 122w of the second receiving portion 122 corresponds to the second diameter 112s of the second color capsule 112. Two second receiving portions 122 may be continuously disposed in the second sub-pixel region 220 in the width direction. In addition, the second sub-pixel region width 220w of the second sub-pixel region 220 and the third sub-pixel width 230w of the third sub-pixel region 230 are the same, the third diameter 113s of the third color capsule 113 is smaller than the second diameter 112s of the second color capsule 112, and the third width 123w of the third receiving portion 123 corresponds to the third diameter 113s of the third color capsule 113. Three third receiving portions 123 may be continuously disposed in the third sub-pixel region 230 in the width direction. When the first, second, and third receiving portions 121, 122, 123 are disposed as described above, the sub-pixel region widths can be formed to be the same even if the widths 121w, 122w, and 123w of the receiving portion that stores the color capsule 110 are different from each other and the diameters 111s, 112s, 113s of the color capsule 110 are different from each other.

Figure 4:
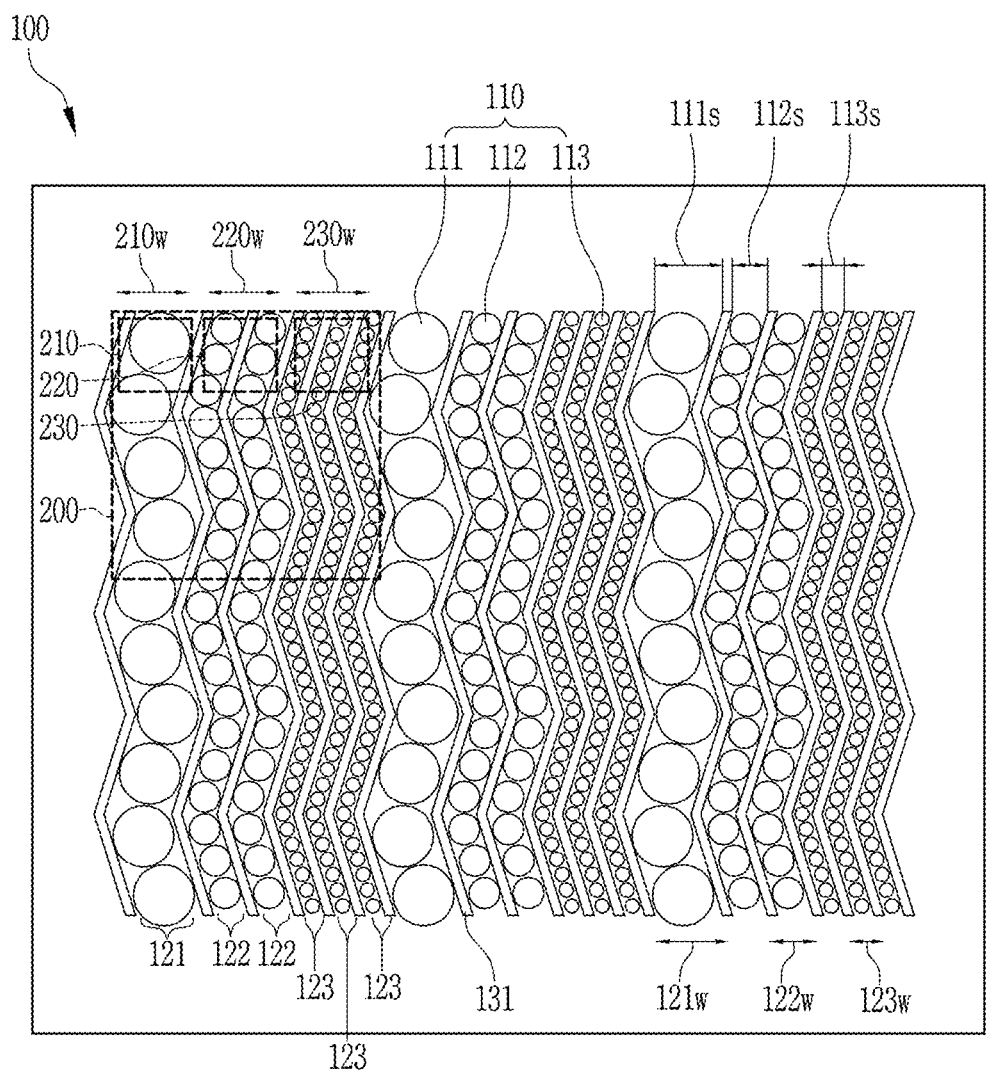
FIG. 4 is a view illustrating a zigzag type plan layout of the reflective display using the color capsules according to an embodiment of the present disclosure.

FIG. 4 is a view illustrating a zigzag type plan layout of the reflective display 100 using the color capsules according to an embodiment of the present disclosure.

As illustrated in FIG. 4, the first receiving portion 121, the second receiving portion 122, and the third receiving portion 123 are arranged side by side in a zigzag shape, and may be arranged repetitively and sequentially in the width direction.

The separating portion 131 that divides the first receiving portion 121, the second receiving portion 122, and the third receiving portion 123 may be formed in the zigzag shape. When the separating portion 131 is formed in the zigzag shape, color mixing in the single pixel region 200 may be efficiently realized, so that the smooth color sense may be provided. In addition, since the first, second, and third sub-pixel region widths 210w, 220w, and 230w of the first, second, and third sub-pixel regions 210, 220, and 230 are the same, the color may be easily displayed.

Figure 5:
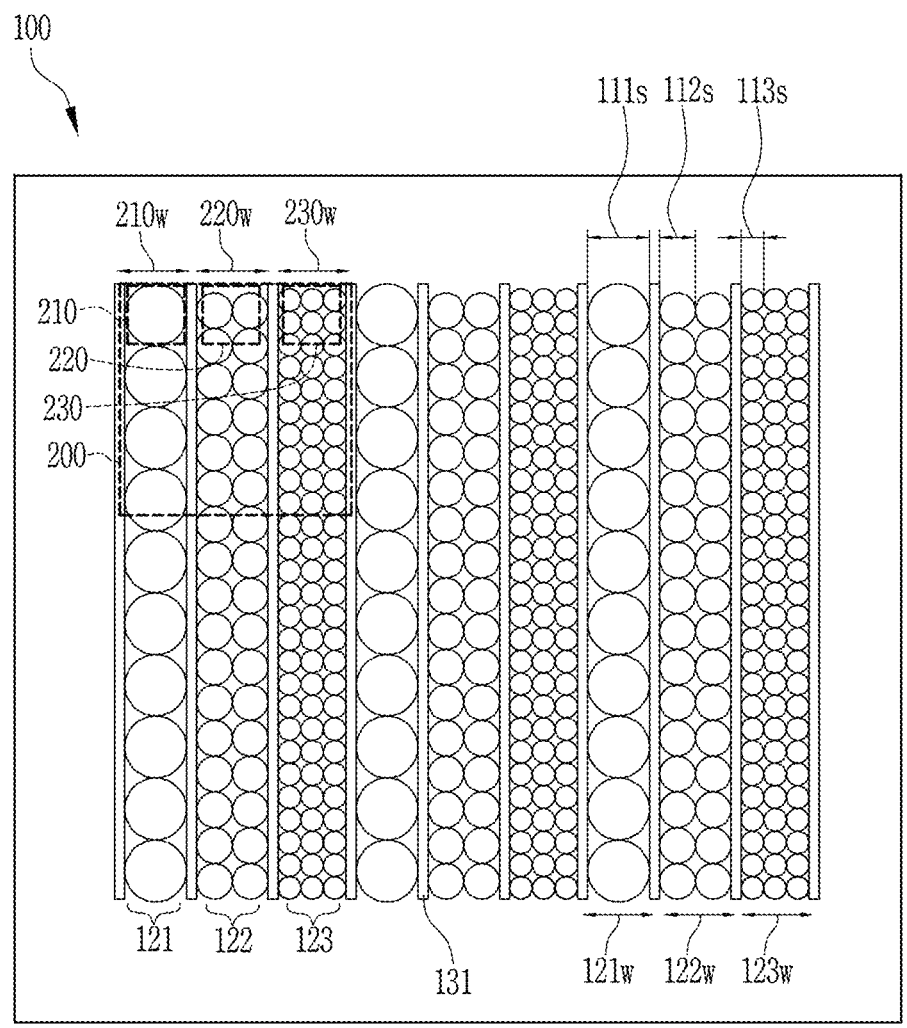
FIG. 5 is a view illustrating plan layout in which a separating portion is not provided in the sub-pixel regions of the reflective display using the color capsules according to an embodiment of the present disclosure.

FIG. 5 is a view illustrating a plan layout in which the separating portion 131 is not provided in the sub-pixel region of the reflective display 100 using the color capsules according to an embodiment of the present disclosure.

As illustrated in FIG. 5, the first receiving portion 121, the second receiving portion 122, and the third receiving portion 123 are formed in the rectilinear shape and are arranged side by side. Further, the first receiving portion 121, the second receiving portion 122, and the third receiving portion 123 may be arranged such that the first receiving portion 121 having the first width 121w that corresponds to the sub-pixel region of the first color, the second receiving portion 122 having the second width 122w that corresponds to the sub-pixel region of the second color, and the third receiving portion 123 having the third width 123w that corresponds to the sub-pixel region of the third color are repetitively and sequentially disposed in the width direction. At this time, the first width 121w, the second width 122w, and the third width 123w may be the same.

The width of the receiving portion and the width of the sub-pixel region may be the same. At this time, the first color capsule 111 may be stored in a row in the first receiving portion 121, the second color capsule 112 may be stored in two rows in the second receiving portion 122, and the third color capsule 113 may be stored in three rows in the third receiving portion 123. Since the first, second, and third sub-pixel region widths 210w, 220w, and 230w of the first, second, and third sub-pixel regions 210, 220, and 230 are the same, the color may be easily displayed. In addition, since there is no separating portion 131 within the sub-pixel region, the layout as described above is suitable for increasing the resolution by minimizing the area of the pixels.

Figure 6:
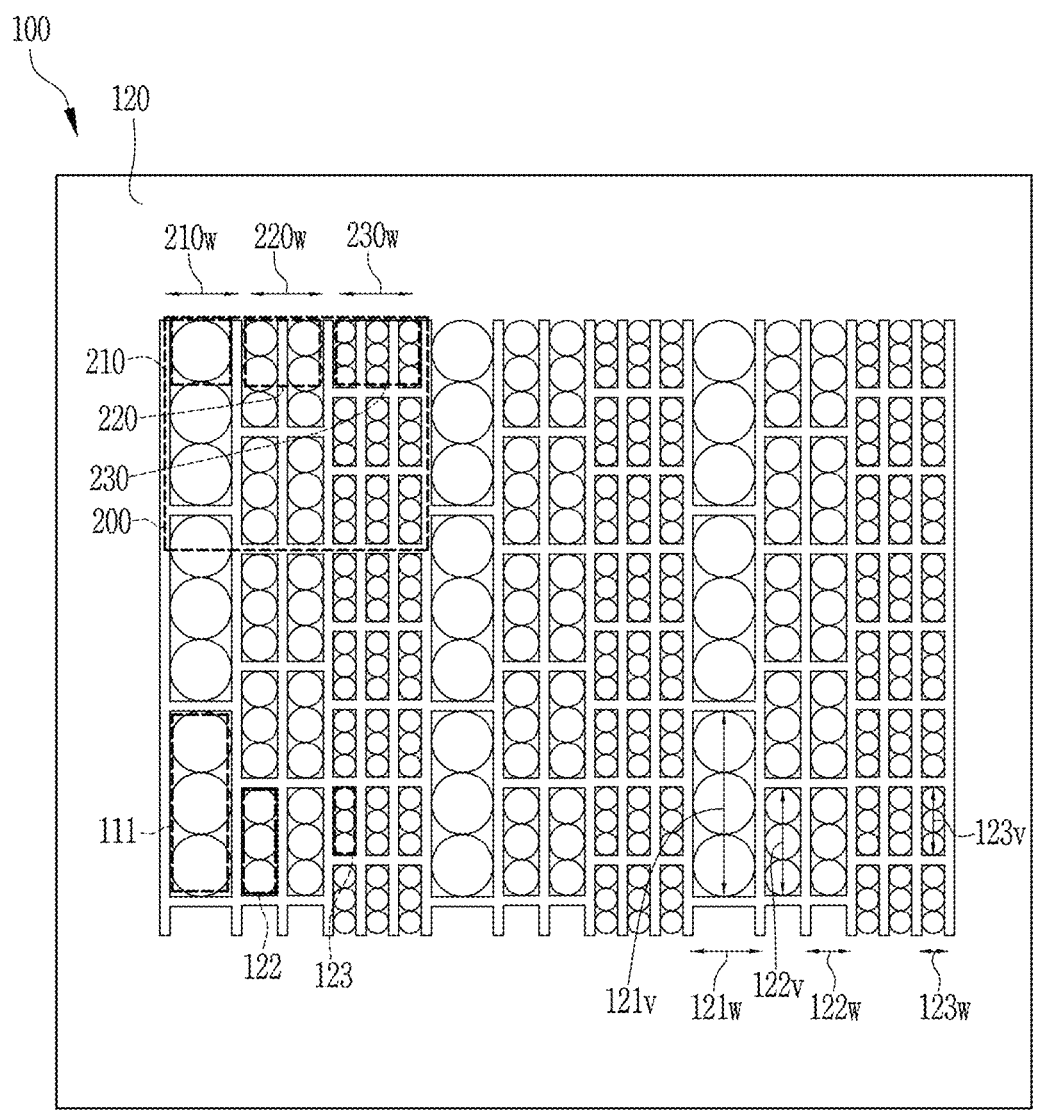
FIG. 6 is a view illustrating a lattice type plan layout of the reflective display using the color capsules according to an embodiment of the present disclosure.

FIG. 6 is a view illustrating a lattice type plan layout of the reflective display 100 using the color capsules according to an embodiment of the present disclosure.

As illustrated in FIG. 6, the first receiving portion 121, the second receiving portion 122, and the third receiving portion 123 may be formed in a lattice shape in which each length of the first receiving portion 121, the second receiving portion 122, and the third receiving portion 123 is a multiple of each width thereof, and may be arranged repetitively and sequentially in the width direction. Further, the plurality of first receiving portions 121, the plurality of second receiving portions 122, and the plurality of third receiving portions 123 may be arranged in a length direction.

For example, the first width 121w of the first receiving portion 121 may correspond to the first diameter 111s of the first color capsule 111, and a first length 121v of the first receiving portion 121 may be determined to be three times the first width 121w of the first receiving portion 121. Therefore, the first receiving portion 121 may store three first color capsules 111. Otherwise, when the first length 121v of the first receiving portion 121 is determined to be twice the first width 121w of the first receiving portion 121, two first color capsules 111 may be stored in the first receiving portion. Similarly, a second length 122v of the second receiving portion may be determined to be two times the second width 122w of the second receiving portion 122, and a third length 123v of the third receiving portion 123 may be determined to be three times the third width 123w of the third receiving portion 123.

Similar to that illustrated in FIG. 3, the first, second, and third sub-pixel region widths 210w, 220w, and 230w of the first sub-pixel region 210, the second sub-pixel region 220, and the third sub-pixel region 230 are formed to be the same, two second receiving portions 122 are disposed in the second sub-pixel region 220 in the width direction, and three third receiving portions 123 are disposed in the third sub-pixel region 230 in the width direction. In addition, in order to the respective receiving portions in the length direction to display the same color, in the receiving portions, the first receiving portion 121 is continuously disposed in the length direction, the second receiving portion 122 is continuously disposed in the length direction, and the third receiving portion 123 is continuously disposed in the length direction.

Figure 7:
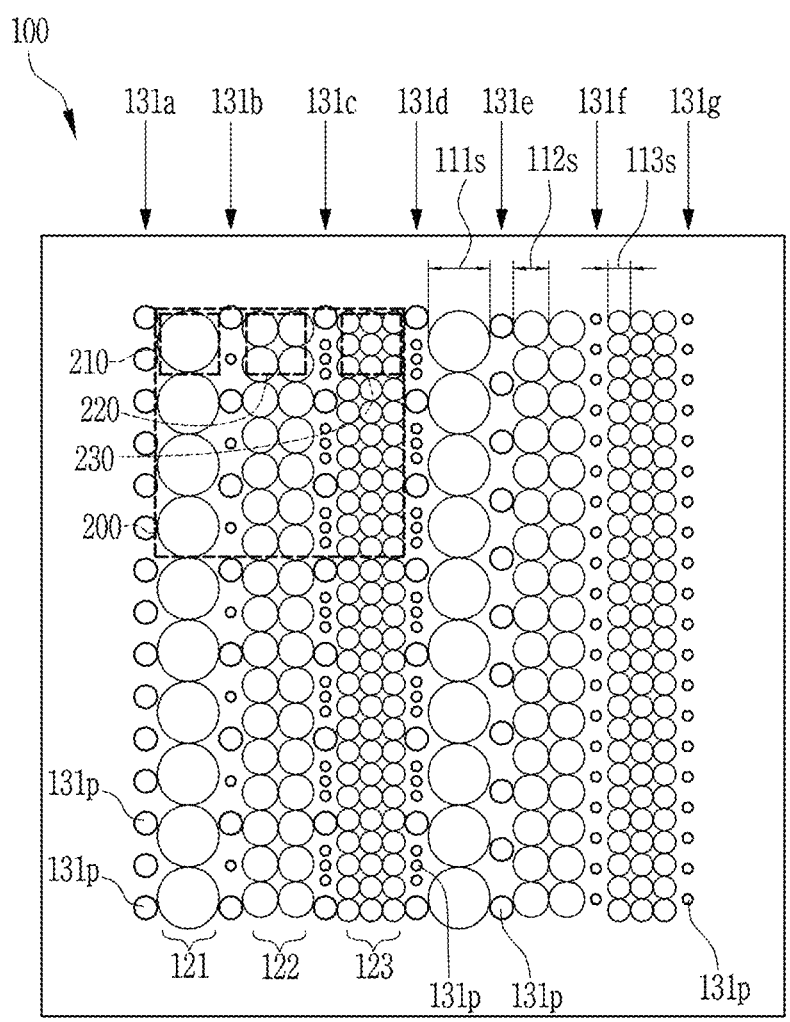
FIG. 7 is a view illustrating a plan layout in which the separating portion of the reflective display using the color capsules according to an embodiment of the present disclosure is formed of a plurality of pillars.

FIG. 7 is a view illustrating a plan layout in which the separating portion 131 of the reflective display 100 using the color capsules according to an embodiment of the present disclosure is formed of a plurality of pillars 131p.

Unlike FIG. 1, the separating portion 131 illustrated in FIG. 7 may be formed of the plurality of pillars 131p. The separating portion 131 may be formed of the plurality of pillars 131p that is disposed to have a distance smaller than the diameter of the color capsule. The plurality of pillars 131p of the separating portion 131 may be formed in a cylindrical shape. The first receiving portion 121 may be formed between a first separating portion 131a and a second separating portion 131b. A distance between the plurality of pillars 131p of the first separating portion 131a is determined to be smaller than the first diameter 111s of the first color capsule 111. A distance between the plurality of pillars 131p of second separating portion 131b is determined to be smaller than the second diameter 112s of the second color capsule 112. The second receiving portion 122 is formed between the second separating portion 131b and a third separating portion 131c, and a distance between the plurality of pillars 131p of the third separating portion 131c and a distance between the plurality of pillars 131p of a fourth separating portion 131d are determined to be smaller than the third diameter 113s of the third color capsule 113. When the distance between the plurality of pillars 131p of the separating portion 131 is formed to be smaller than the distance between the color capsules 110, the color capsules 110 may not leave the receiving portion.

The diameter of the plurality of pillars 131p may be variously formed. A fifth separating portion 131e, a sixth separating portion 131f, and a seventh separating portion 131g are formed of the plurality of pillars 131p having the same diameter for each separating portion 131, respectively. The diameter of the plurality of pillars 131p of the fifth separating portion 131e may be larger than the diameter of the plurality of pillars 131p of the sixth separating portion 131f. Otherwise, the plurality of pillars 131p may be formed to be blended in which the plurality of pillars 131p having large diameter, such as the second separating portion 131b, the third separating portion 131c, and the fourth separating portion 131d, and the plurality of pillars 131p having small diameter are blended. Since the smaller the diameter of the plurality of pillars 131p, the smaller the distance between the sub-pixel region and the adjacent sub-pixel region, the layout as described above may be suitable for increasing the resolution.

The plan layouts of the reflective display 100 illustrated in FIG. 1 and FIGS. 3 to 7 may be manufactured by injecting the color capsule 110 to the determined receiving portion by using the diameter difference of the color capsule 110.

According to an embodiment of the present disclosure, a method of manufacturing the reflective display 100 using the color capsule may include: preparing a substrate in which the first receiving portion 121 having the first width 121w, the second receiving portion 122 having the second width 122w, and the third receiving portion 123 having the third width 123w are formed by forming the separating portion 131 on the first substrate 120; forming a color capsule in which the first color capsule 111 having the first diameter 111s, the second color capsule 112 having the second diameter 112s, and the third color capsule 113 having the third diameter 113s are formed; and disposing the color capsule in which the first color capsule 111 is inserted into the first receiving portion 121, the second color capsule 112 is inserted into the second receiving portion 122, and the third color capsule 113 is inserted into the third receiving portion 123. At this time, the first diameter 111s of the first color capsule 111 corresponds to the first width 121w of the first receiving portion 121, the second diameter 112s of the second color capsule 112 corresponds to the second width 122w of the second receiving portion 122w, and the third diameter 113s of the third color capsule 113 corresponds to the third width 123w of the third receiving portion 123.

The preparing of the substrate is a process of forming the receiving portion by forming the separating portion 131 on the first substrate 120. In the preparing of the substrate, the process of forming the separating portion 131 may be performed by using methods generally used in a display manufacturing process. However, since the distance between the separating portion 131 and the adjacent separating portion 131 determines the width of the receiving portion, the distance between the separating portion 131 and the adjacent separating portion 131 may be determined differently according to the width of the sub-pixel region or may be determined differently according to the plan layout.

When the reflective display 100 is manufactured according to the plan layout illustrated in FIG. 1, in the preparing of the substrate, the first width 121w of the first receiving portion 121 is formed to correspond to the first diameter 111s of the first color capsule 111, the second width 122w of the second receiving portion 122 is formed to correspond to the second diameter 112s of the second color capsule 112, and the third width 123w of the third receiving portion 123 is formed to correspond to the third diameter 113s of the third color capsule 113.

When the reflective display 100 is manufactured according to the plan layout illustrated in FIG. 3, in the preparing of the substrate, a structure in which one row of the first receiving portion 121, two rows of the second receiving portion 122, and three rows of the third receiving portion 123 are formed is repeated in the width direction. At this time, the first width 121w of the first receiving portion 121 is determined to correspond to the first sub-pixel region width 210w of the first sub-pixel region 210 and the first diameter 111s of the first color capsule 111, the second width 122w of the second receiving portion 122 is determined to correspond to the second sub-pixel region width 220w of the second sub-pixel region 220 when two second receiving portions 122 are continuously disposed, and the third width 123w of the third receiving portion 123 is determined to correspond to the third sub-pixel region width 230w of the third sub-pixel region 230 when three third receiving portions 123 are continuously disposed. At this time, the first sub-pixel region width 210w of the first sub-pixel region 210, the second sub-pixel region width 220w of the second sub-pixel region 220, and the third sub-pixel region width 230w of the third sub-pixel region 230 are the same.

When the reflective display 100 is manufactured according to the plan layout illustrated in FIG. 4, in the preparing of the substrate, the separating portion 131 is formed in the zigzag shape, so that the receiving portion formed between the separating portions 131 may be formed in the zigzag shape.

When the reflective display 100 is manufactured according to the plan layout illustrated in FIG. 5, in the preparing of the substrate, the first width 121w of the first receiving portion 121, the second width 122w of the second receiving portion 122, and the third width 123w of the third receiving portion 123 may be formed to be the same.

When the reflective display 100 is manufactured according to the plan layout illustrated in FIG. 6, in the preparing of the substrate, the first receiving portion 121 in which the first width 121w of the first receiving portion 121 corresponds to the first color capsule 111 and the first length 121v of the first receiving portion 121 is a multiple of the first width 121w of the first receiving portion 121, the second receiving portion 122 in which the second width 122w of the second receiving portion 122 corresponds to the second color capsule 112 and the second length 122v of the second receiving portion 122 is a multiple of the second width 122w of the second receiving portion 122, and the third receiving portion 123 in which the third width 123w corresponds to the third color capsule 113 and the third length 123v of the third receiving portion 123 is a multiple of the third width 123w of the third receiving portion 123.

When the reflective display 100 is manufactured according to the plan layout illustrated in FIG. 7, in the preparing of the substrate, the separating portion 131 may be formed of the plurality of pillars 131p spaced apart from each other instead of a wall shape.

The forming of the color capsule is a process of manufacturing the plurality of color capsules 110 having diameters different from each other. For example, during the forming of the color capsule, the first color capsule 111 having the first diameter 111s, the second color capsule 112 having the second diameter 112s, and the third color capsule 113 having the third diameter 113s may be formed. At this time, among the first diameter 111s, the second diameter 112s, and the third diameter 113s, the first diameter 111s may be the largest and the third diameter 113s may be the smallest. The diameter of the color capsule 110, the width of the pixel region 200, the width of the sub-pixel region, and the width of the receiving portion may be determined according to the plan layout of the reflective display 100.

The outer wall of the color capsule 110 may be formed by using an isoelectric point by applying a coacervation microencapsulation method, or may be formed by using other methods. For example, the outer wall of the color capsule 110 may be formed by methods such as emulsion polymerization, multi-stage emulsion polymerization, condensation polymerization, solvent extraction and evaporation, suspension cross-linking method, coacervation, extrusion, spraying, or the like.

When the receiving portion is formed on the first substrate 120 and the color capsule 110 is prepared, the disposing process of the color capsule is performed.

In the disposing process of the color capsule, an inkjet method, an inhalation method, and a screen printing method may be used as a method of inserting the color capsule 110 inside the receiving portion.

Figure 8:
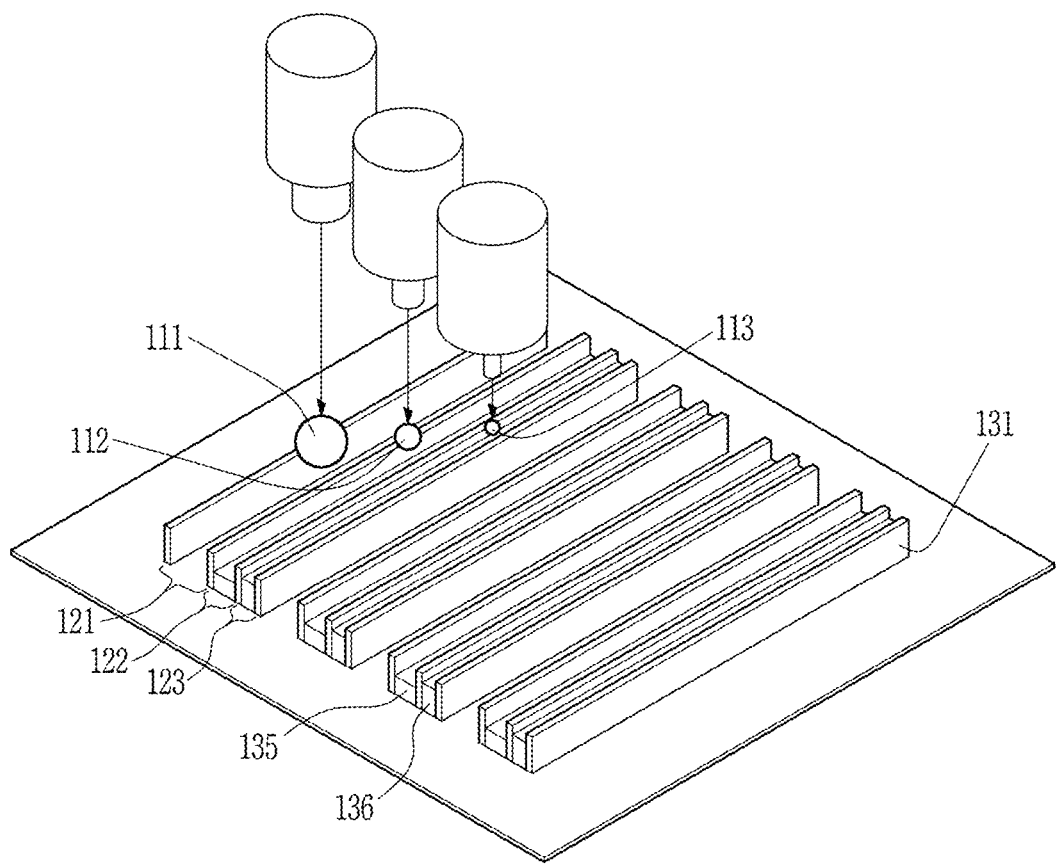
FIG. 8 is a view illustrating a method of manufacturing the reflective display using the color capsules according to an embodiment of the present disclosure, the method using an inkjet method.

FIG. 8 is a view illustrating a method of manufacturing the reflective display 100 using the color capsules according to an embodiment of the present disclosure, the method using an inkjet method.

In the disposing process of the color capsule, by using the inkjet method, the first color capsule 111 having the first diameter 111s can be output to the first receiving portion 121 having the first width 121w through a first nozzle, the second color capsule 112 having the second diameter 112s can be output to the second receiving portion 122 having the second width 122w through a second nozzle, and the third color capsule 113 having the third diameter 113s can be output to the third receiving portion 123 having the third width 123w through a third nozzle. The first color capsule 111, the second color capsule 112, and the third color capsule 113 may be output from respective nozzles at the same time.

However, it is preferable that the first color capsule 111 is output at first and then the first color capsule 111 that deviates from the first receiving portion 121 is removed, in next, the second color capsule 112 is output and then the second color capsule 112 that deviates from the second receiving portion 122 is removed, and then the third color capsule 113 is output and then the third color capsule 113 that deviates from the third receiving portion 123 is removed. Since the first color capsule 111 has the largest diameter, the first color capsule 111 that deviates from the first receiving portion 121 cannot be inserted into the second receiving portion 122 or the third receiving portion 123 that has small width, so that it is preferable to output the first color capsule 111 first. Next, when the second color capsule 112 is output, the second color capsule 112 that deviates from the second receiving portion 122 cannot be inserted into the third receiving portion 123 having a small width, and the first color capsule 111 is already inserted into the first receiving portion 121, so that the second color capsule 112 cannot be inserted into the first receiving portion 121. Next, when the third color capsule 113 is output, the third color capsule 113 that deviates from the third receiving portion 123 cannot be inserted into the first receiving portion 121 or the second receiving portion 122 in which the color capsule 110 is already inserted. Therefore, the color capsule 110 can be inserted into the predetermined receiving portion, according to the width of the receiving portion. The inkjet method is suitable for manufacturing the reflective display 100 having the plan layout illustrated in FIGS. 1, 3, 4 and 6.

Figure 9:
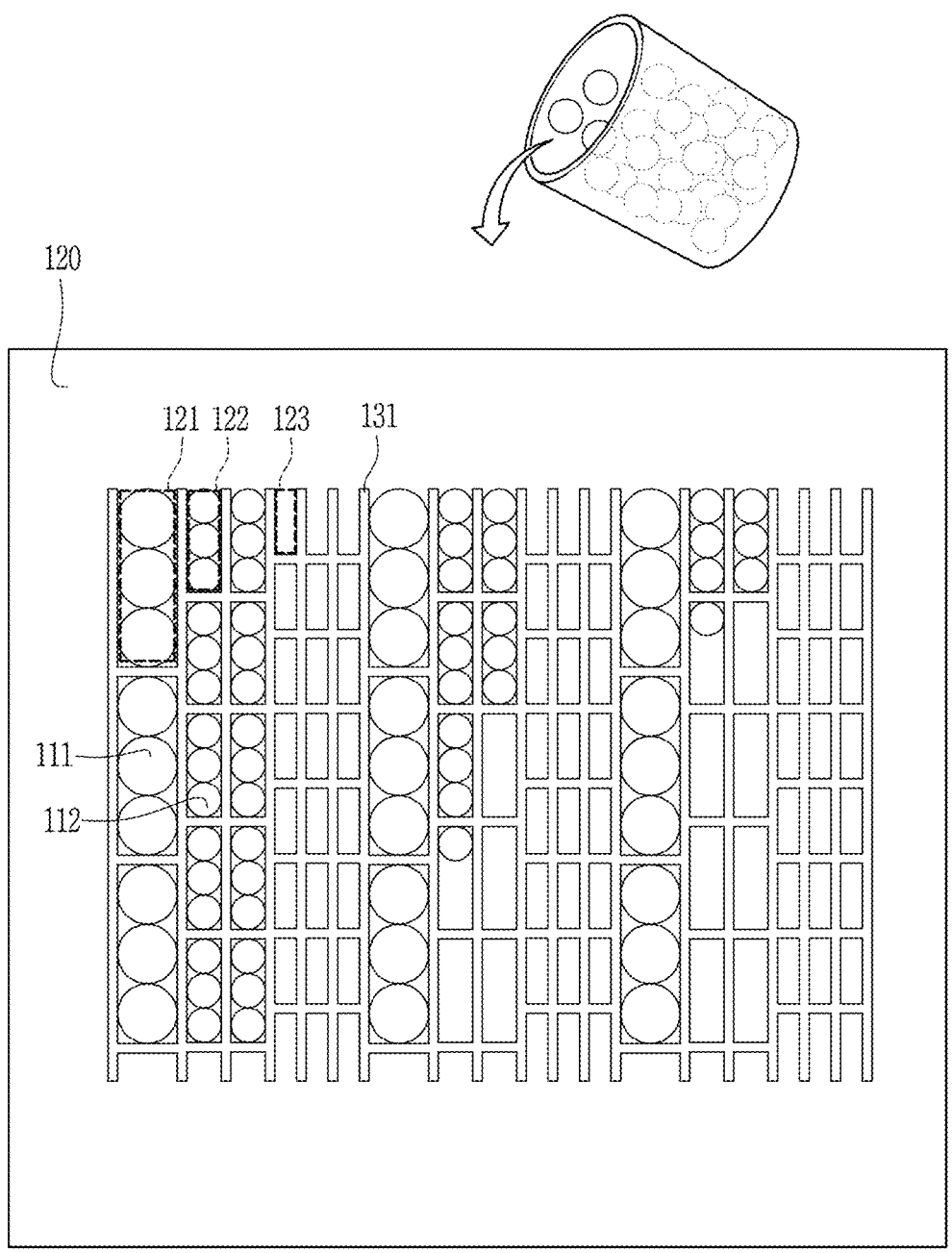
FIG. 9 is a view illustrating the method of manufacturing the reflective display using the color capsules according to an embodiment of the present disclosure, the method using a lamination method.

FIG. 9 is a view illustrating the method of manufacturing the reflective display 100 using the color capsules according to an embodiment of the present disclosure, the method using a screen printing method. FIG. 9 illustrates a state in which the second color capsule 112 is applied after the first color capsule 111 is applied.

As illustrated in FIG. 9, in the disposing process of the color capsule, by using the screen printing method, solution including the first color capsule 111 may be applied on the first substrate 120 such that the first color capsule 111 having the first diameter 111s is stored in the first receiving portion 121 having the first width 121w, solution including the second color capsule 112 may be applied on the first substrate 120 such that the second color capsule 112 having the second diameter 112s is stored in the second receiving portion 122 having the second width 122w, and solution including the third color capsule 113 may be applied on the first substrate 120 such that the third color capsule 113 having the third diameter 113s is stored in the third receiving portion 123 having the third width 123w.

Similar to the order described above with reference to FIG. 8, in the disposing process of the color capsule described with reference to FIG. 9, the disposing process of the color capsule is preferable to be performed in an order that the first color capsule 111 is applied at first and then the first color capsule 111 that is not inserted into the first receiving portion 121 is removed, the second color capsule 112 is applied and then the second color capsule 112 that is not inserted into the second receiving portion 122 is removed, and then the third color capsule 113 is applied and then the third color capsule 113 that is not inserted into the third receiving portion 123 is removed. The disposing process of the color capsule using the screen printing method described with reference to FIG. 9 may be applied when the reflective display 100 using the plan layout illustrated in FIGS. 1, 3, 4, and 6.

Figure 10:
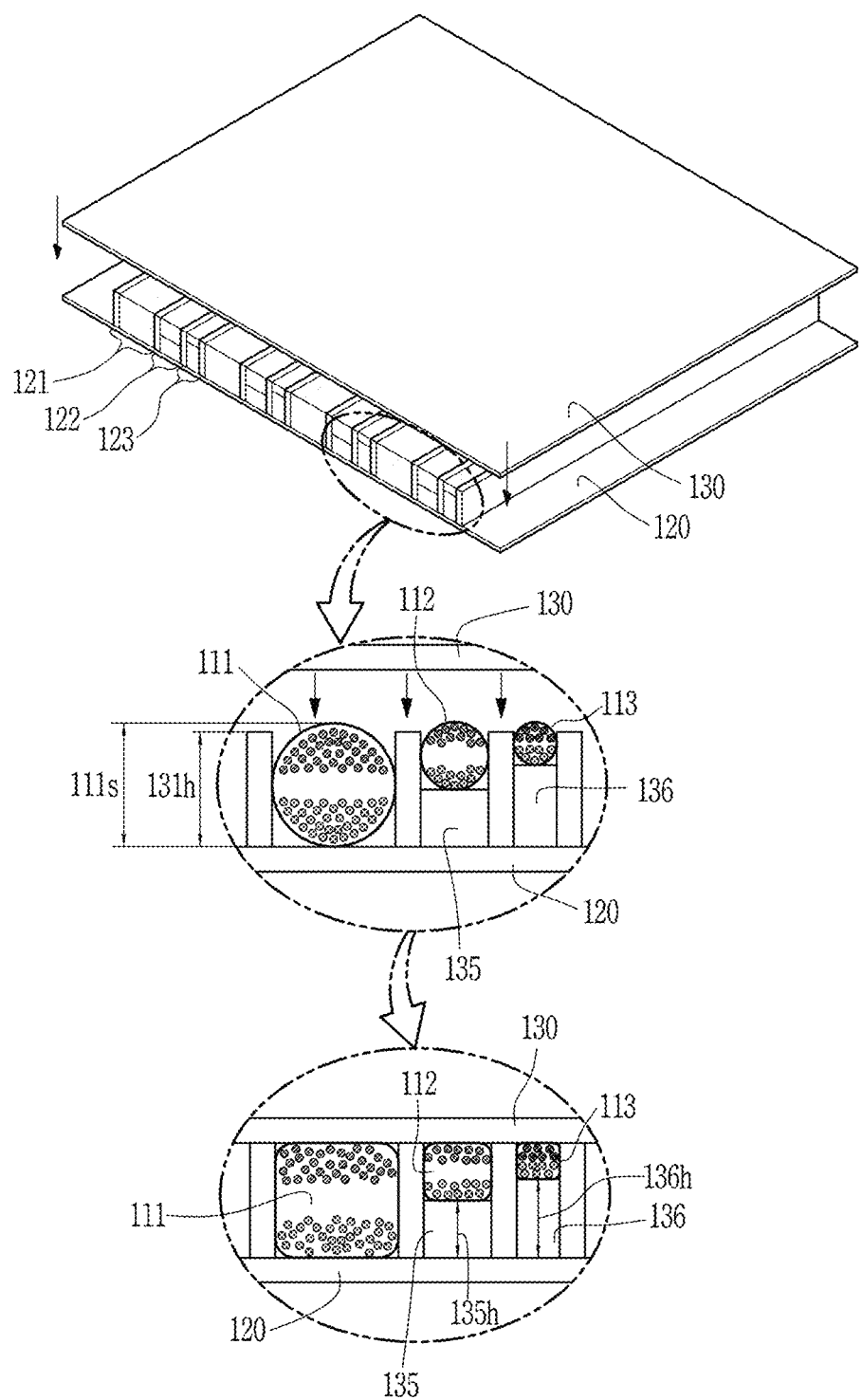
FIG. 10 is a view illustrating a process of covering with a second substrate in the method of manufacturing the reflective display using the color capsules according to an embodiment of the present disclosure.

FIG. 10 is a view illustrating a process of covering with the second substrate 130 in the method of manufacturing the reflective display 100 using the color capsules according to an embodiment of the present disclosure.

After the disposing process of the color capsule described with reference FIGS. 8 and 9, assembling of the second substrate 130 in which the second substrate 130 that covers the upper surface of the receiving portion is assembled may be performed. The height 131h of the receiving portion is formed to correspond to the first diameter 111s of the first color capsule 111 having the largest diameter. Otherwise, the height 131h of the receiving portion may be formed to be slightly smaller than the first diameter 111s of the first color capsule 111. When the height 131h of the receiving portion is slightly smaller than the first diameter 111s of the first color capsule 111, the color capsule 110 can be deformed so as to be in close contact with each other by being pressed by the second substrate 130 when the second substrate 130 is coupled to be in close contact with the upper surface of the receiving portion. For example, the first color capsule 111 formed in a spherical shape may be deformed in a hexahedral shape having rounded edges, so that a space between the first color capsule 111 and the adjacent first color capsule 111 may be filled. This deformation may occur in the second color capsule 112 and the third color capsule 113. In determining the second height 135h of the second spacer 135 that supports the second color capsule 112 and the third height 136h of the third spacer 136 that supports the third color capsule 113, the degree of deformation of the second color capsule 112 and the third color capsule 113 can be considered when the second substrate 130 is coupled.

When the first substrate 120 and the second substrate 130 are coupled to each other, forming of a first operating portion in which the first electrode layer 141 is formed on the lower surface of the first substrate 120 and the first protective layer 151 is formed on the lower surface of the first electrode layer 141, and forming of a second operating portion in which the second electrode layer 142 is formed on the upper surface of the second substrate 130 and the second protective layer 152 is formed on the upper surface of the second electrode layer 142 may be performed. Otherwise, the forming of the first operating portion and the forming of the second operating portion may be performed before the preparing of the substrate, so that an order in which the separating portion 131 is formed on the first substrate 120 that is provided with the first electrode layer 141 and the first protective layer 151 and then the color capsule 110 is disposed and then the second substrate 130 that is provided with the second electrode layer 142 and the second protective layer 152 is coupled to the upper surface of the separating portion 131.

Figure 11:
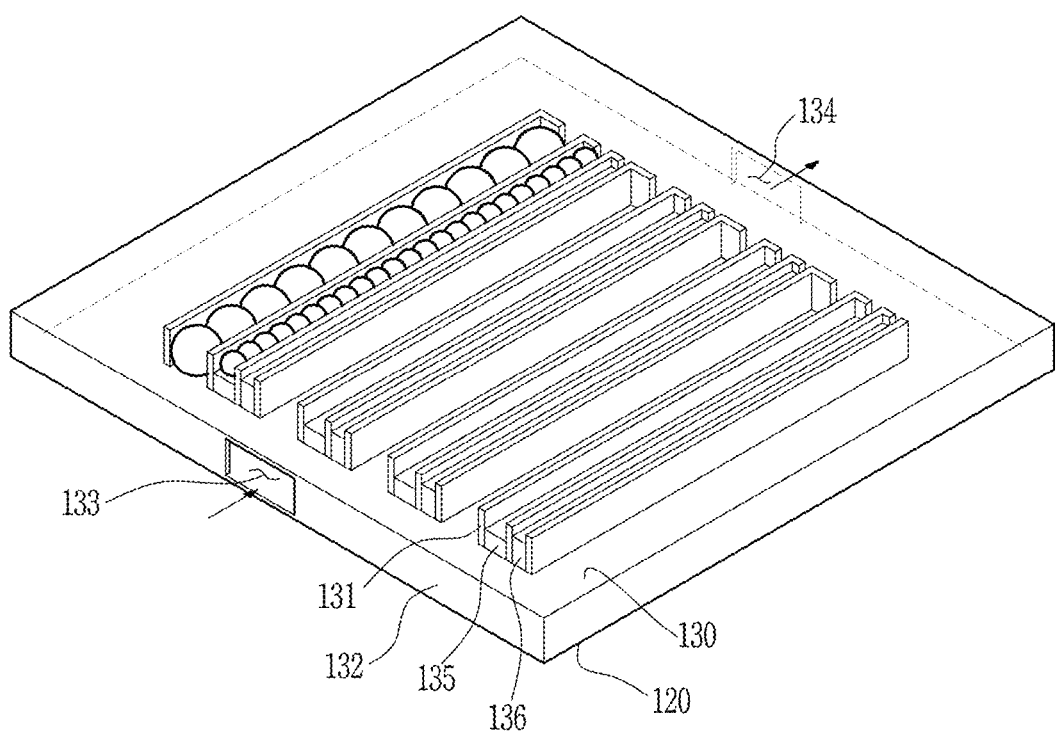
FIG. 11 is a view illustrating a process of disposing the color capsules by using an inlet port in the method of manufacturing the reflective display using the color capsules according to an embodiment of the present disclosure.
Figure 12:
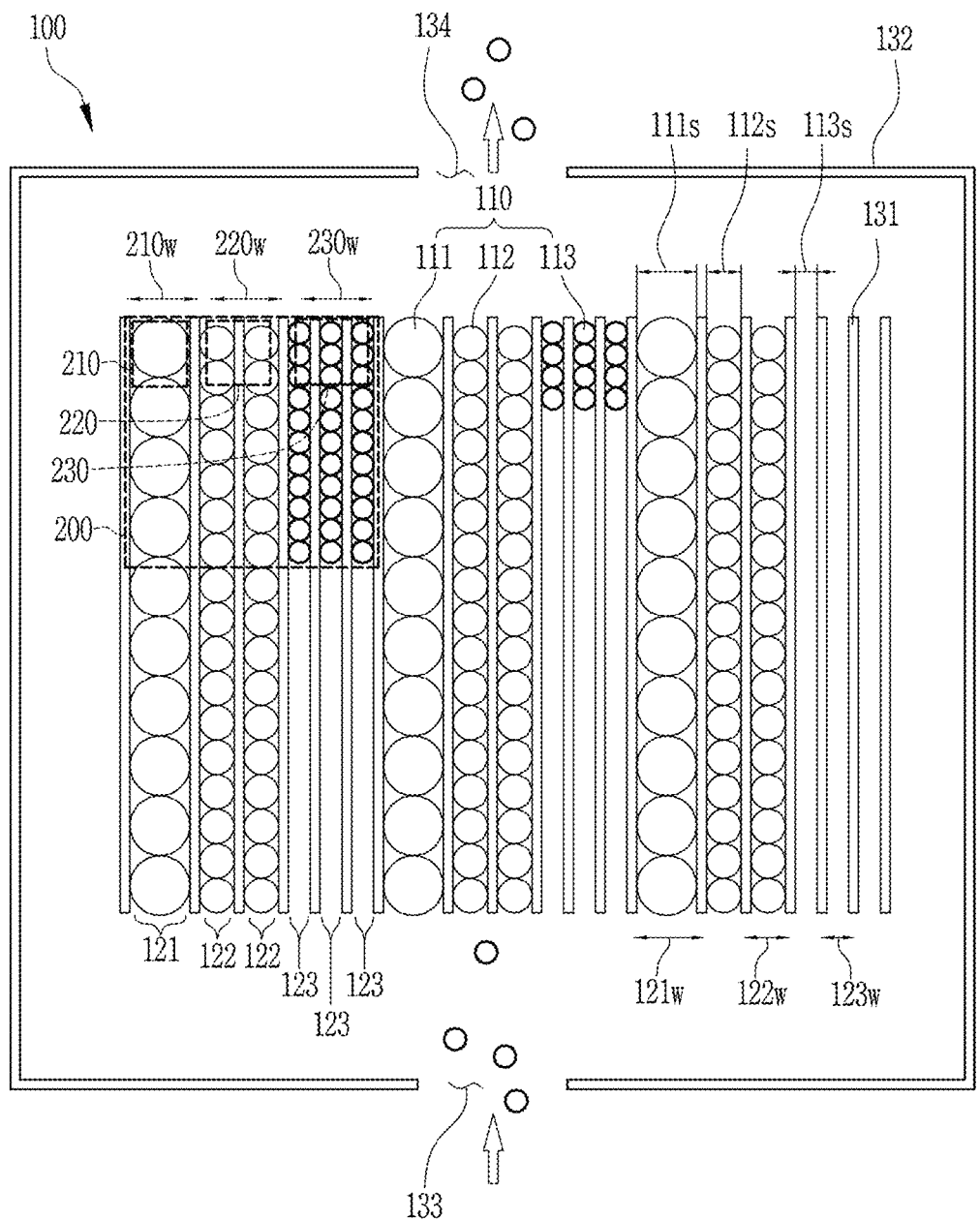
FIG. 12 is a view illustrating the process of disposing the color capsules by using the inlet port in the method of manufacturing the reflective display using the color capsules according to an embodiment of the present disclosure when the widths of the sub-pixel regions are the same.

FIG. 11 is a view illustrating a process of disposing the color capsule 110 by using an inlet port 133 in the method of manufacturing the reflective display 100 using the color capsules according to an embodiment of the present disclosure. FIG. 12 is a view illustrating the process of disposing the color capsule 110 by using the inlet port 133 in the method of manufacturing the reflective display 100 using the color capsules according to an embodiment of the present disclosure when the widths of the sub-pixel regions are the same. Hereinafter, the process will be described with reference to FIGS. 11 and 12 together.

When the reflective display 100 having the plan layout illustrated in FIGS. 1, 3, and 4 is manufactured, in the preparing of the substrate, the plan layout same as illustrated in FIG. 1 may be formed by forming the first receiving portion 121 having the first width 121w, the second receiving portion 122 having the second width 122w, and the third receiving portion 123 having the third width 123w, which is realized by forming the separating portion 131 between the first substrate 120 and the second substrate 130 that is spaced apart from the first substrate 120 in a direction toward the upper surface. Otherwise, in the preparing of the substrate, the structure in which one row of the first receiving portion 121, two rows of the second receiving portion 122, three rows of the third receiving portion 123 are repeated in the width direction is formed, the first width 121w of the first receiving portion 121 corresponds to the first sub-pixel region width 210w of the first sub-pixel region 210 and corresponds to the first diameter 111s of the first color capsule 111, the second width 122w of the second receiving portion 122 corresponds to the second sub-pixel region width 220w of the second sub-pixel region 220 when two second receiving portions 122 are continuously disposed, the third width 123w of the third receiving portion 123 corresponds to the third sub-pixel region width 230w of the third sub-pixel region 230 when three third receiving portions 123 are continuously disposed, and the first, second, and third sub-pixel region widths 210w, 220w, and 230w of the first, second, and third sub-pixel region 210, 220, and 230 are the same, so that the plan layout same as the plan layout illustrated in FIGS. 3, 4, and 12 may be formed.

At this time, an outer portion 132 may be further formed such that a perimeter of the first substrate 120 and a perimeter of the second substrate 130 are connected to each other, the inlet port 133 is formed on a first side of the outer portion 132, and an outlet port 134 is formed on a second side of the outer portion 132.

The disposing process of the color capsule may include: injecting the first color capsule 111 through the inlet port 133 such that the first color capsule 111 having the first diameter 111s is inserted into the first receiving portion 121 having the first width 121w; injecting the second color capsule 112 through the inlet port 133 such that the second color capsule 112 having the second diameter 112s is inserted into the second receiving portion 122 having the second width 122w; and injecting the third color capsule 113 through the inlet port 133 such that the third color capsule 113 having the third diameter 113s is inserted into the third receiving portion 123 having the third width 123w. Further, among the first diameter 111s, the second diameter 112s, and the third diameter 113s, the first diameter 111s may be determined to be the largest and the third diameter 113s may be determined to be the smallest. After the injecting of the first color capsule 111 that has the largest diameter is performed, the injecting of the second color capsule 112 that has the next larger diameter is performed, and the injecting of the third color capsule 113 that has the smallest diameter is performed. At the inlet port 133, liquid including the color capsule 110 can be injected between the first substrate 120 and the second substrate 130 by applying pressure to the liquid, and negative pressure is formed at the outlet port 134, so that the liquid and the color capsule 110 are inhaled and the color capsule 110 can be inserted into the receiving portion.

When the first color capsule 111 is injected, the first color capsule 111 is injected into the first receiving portion 121 which corresponds to the first diameter 111s and which has the first width 121w. The first color capsule 111 is not injected into second receiving portion 122 and the third receiving portion 123 that have narrow width. In the same manner, the second color capsule 112 is not injected into the third receiving portion 123 that has narrow width, and is inserted into the second receiving portion 122. Further, since the first color capsule 111 is injected into the first receiving portion 121, the second color capsule 112 is not injected into the first receiving portion 121. In the same manner, the third color capsule 113 is injected into the third receiving portion 123, and is not injected into both the first receiving portion 121 and the second receiving portion 122 in which the color capsules are 110 already injected.

Figure 13:
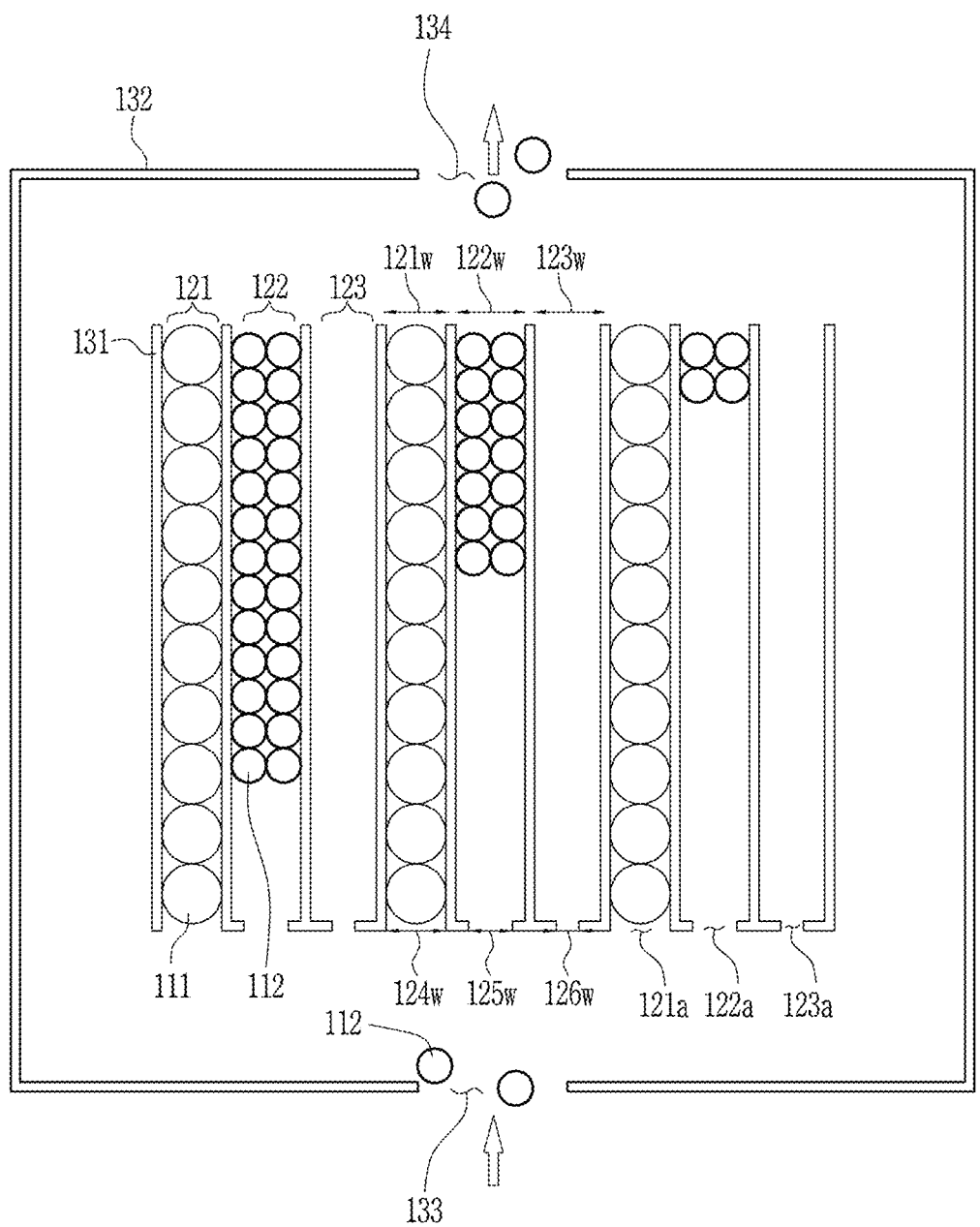
FIG. 13 is a view illustrating a process of injecting the color capsules in the method of manufacturing the reflective display using the color capsules according to an embodiment of the present disclosure when the widths of the sub-pixel regions are the same and the separating portion is not provided in the sub-pixel regions.

FIG. 13 is a view illustrating a process of injecting the color capsule 110 in the method of manufacturing the reflective display 100 using the color capsules according to an embodiment of the present disclosure when the widths of the sub-pixel regions are the same and the separating portion 131 is not provided in the sub-pixel regions.

In order to manufacture the reflective display 100 having the plan layout illustrated in FIG. 5, in the preparing of the substrate, the first receiving portion 121 provided with a first entrance 121a having a fourth width 124w, the second receiving portion 122 provided with a second entrance 122a having a fifth width 125w, and the third receiving portion 123 provided with a third entrance 123a having a sixth width 126w are formed by forming the separating portion 131 between the first substrate 120 and the second substrate 130 that is spaced apart in the direction toward the upper surface of the first substrate 120, and the first width 121w of the first receiving portion 121, the second width 122w of the second receiving portion 122, and the third width 123w of the third receiving portion 123 may be formed to be the same.

In the structure illustrated in FIG. 13, the first width 121w of the first receiving portion 121, the second width 122w of the second receiving portion 122, and the third width 123w of the third receiving portion 123 are formed to be the same, but the structure is configured such that the color capsule 110 is introduced into the respective receiving portions since the entrances are respectively formed on the receiving portions. That is, since the first width 121w of the first receiving portion 121 and the second width 122w of the second receiving portion 122 are formed to be the same, the first color capsule 111 may be stored in the second receiving portion 122. However, since the entrance having the fifth width 125w in which only the second color capsule 112 can pass therethrough and the first color capsule 111 cannot pass therethrough is formed at the second receiving portion 122, the first color capsule 111 cannot pass through the second entrance 122a, so that the first color capsule 111 cannot be introduced into the second receiving portion 122. In the same manner, since the entrance having the sixth width 126w in which the third color capsule 113 can pass therethrough and the second color capsule cannot pass therethrough is formed at the third receiving portion 123, the second color capsule 112 cannot be introduced into the third receiving portion 123.

In the disposing process of the color capsule, it is preferable to perform the disposing process of the color capsule in an order in which the injecting of the first color capsule 111 is performed and then the injecting of the second color capsule 112 is performed and then the injecting of the third color capsule 113 is performed.

Figure 14:
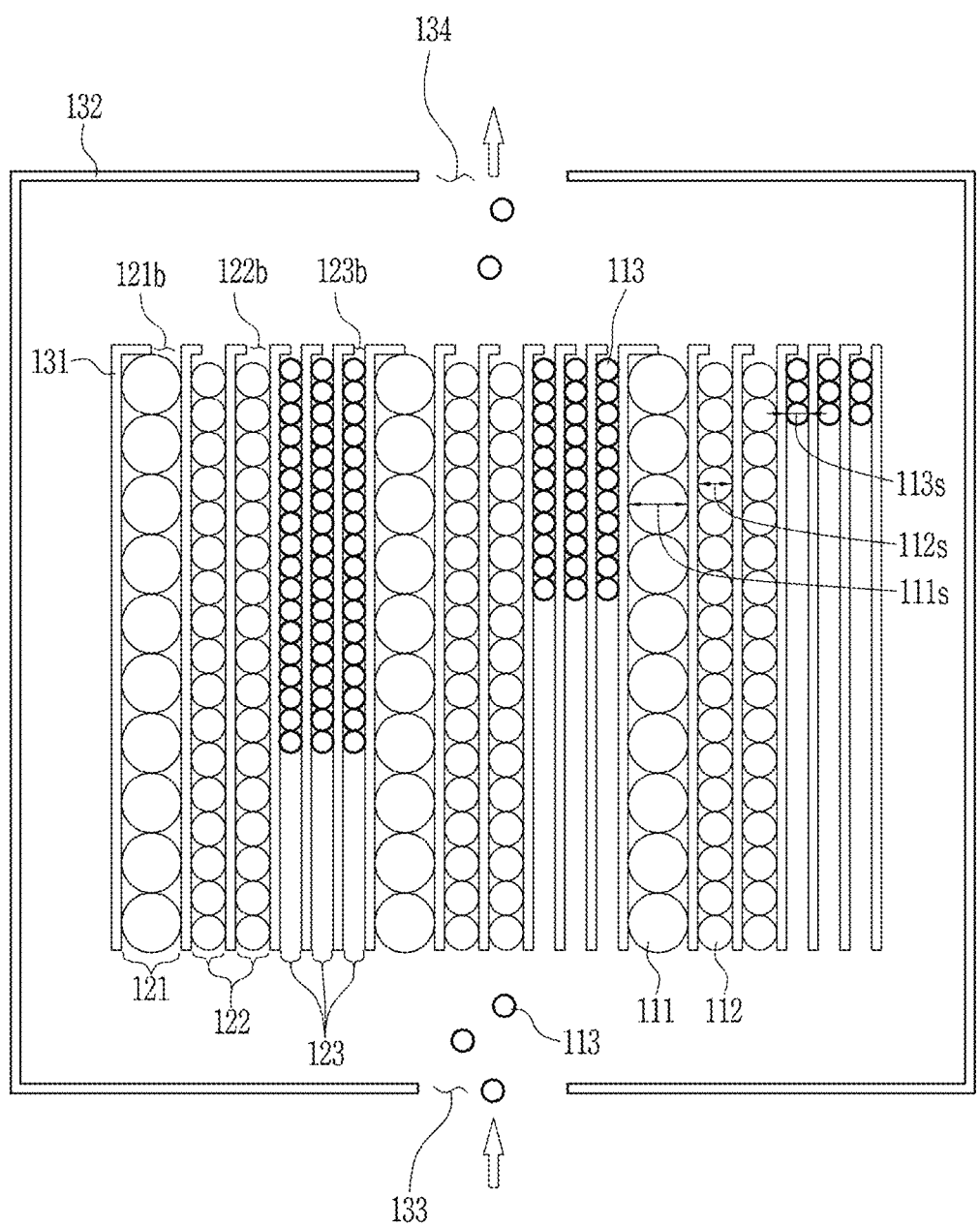
FIG. 14 is a view illustrating the process of disposing the color capsules by using the inlet port in the method of manufacturing the reflective display using the color capsules according to an embodiment of the present disclosure when the widths of the sub-pixel regions are the same and exits are provided in the receiving portion.

FIG. 14 is a view illustrating the process of disposing the color capsule 110 by using the inlet port 133 in the method of manufacturing the reflective display 100 using the color capsules according to an embodiment of the present disclosure when the widths of the sub-pixel regions are the same and exits are provided in the receiving portion.

In the preparing of the substrate, a first exit 121b having a width smaller than the first diameter 111s of the first color capsule 111 may be further formed at opposite side of the first entrance 121a of the first receiving portion 121, the second exit 122b having a width smaller than the second diameter 112s of the second color capsule 112 may be further formed at opposite side of the second entrance 122a at the second receiving portion 122, and a third exit 123b having a width smaller than the third diameter 113s of the third color capsule 113 may be further formed at opposite side of the third entrance 123a of the third receiving portion 123.

The separating portion 131 may form the exit on a direction toward the outlet port 134 of the receiving portion, the exit being configured to prevent the color capsule 110 from escaping and being configured such that only liquid can escape therethrough. Since the color capsule 110 one introduced into the receiving portion is blocked by the exit and is not discharged through the outlet port 134, consumption of the color capsule 110 used in the disposing process of the color capsule can be reduced.

Figure 15:
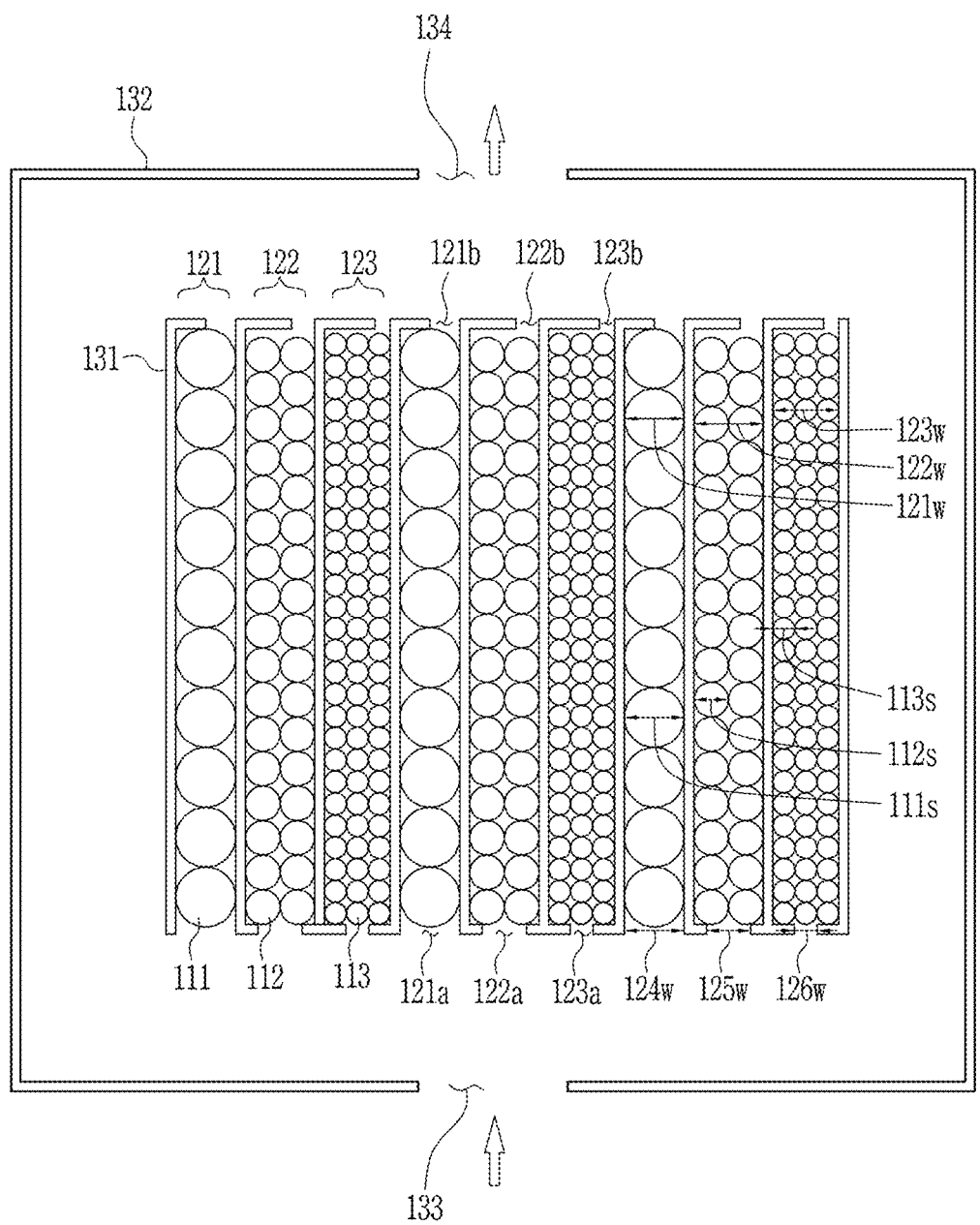
FIG. 15 is a view illustrating the process of disposing the color capsules by using the inlet port in the method of manufacturing the reflective display using the color capsules according to an embodiment of the present disclosure when entrances and the exits are provided in the receiving portion.

FIG. 15 is a view illustrating the process of disposing the color capsule 110 by using the inlet port 133 in the method of manufacturing the reflective display 100 using the color capsules according to an embodiment of the present disclosure when entrances and the exits are provided in the receiving portion.

In the preparing of the substrate, the first width 121w of the first receiving portion 121, the second width 122w of the second receiving portion 122, and the third width 123w of the third receiving portion 123 may be formed to be the same by forming the separating portion 131 between the first substrate 120 and the second substrate 130 that is spaced apart in the direction toward the upper surface of the first substrate 120. Further, the first entrance 121a of the first receiving portion 121 may have the fourth width 124w, the second entrance 122a of the second receiving portion 122 may have the fifth width 125w, and the third entrance 123a of the third receiving portion 123 may have the sixth width 126w. Further, the first exit 121b having the width smaller than the first diameter 111s of the first color capsule 111 may be further formed at the opposite side of the first entrance 121a of the first receiving portion 121, the second exit 122b having the width smaller than the second diameter 112s of the second color capsule 112 may be further formed at the opposite side of the second entrance 122a of the second receiving portion 122, and the third exit 123b having the width smaller than the third diameter 113s of the third color capsule 113 may be further formed at the opposite side of the third entrance 123a of the third receiving portion 123.

In this structure, when the disposing of the color capsule is performed, the first color capsule 111 that has passed through the entrance having the first width 121w is blocked by the first exit 121b of the first receiving portion 121, so that the first color capsule 111 is not discharged through the outlet port 134. In the same manner, the second color capsule 112 and the third color capsule 113 may be respectively inserted into the second receiving portion 122 and the third receiving portion 123.

Figure 16:
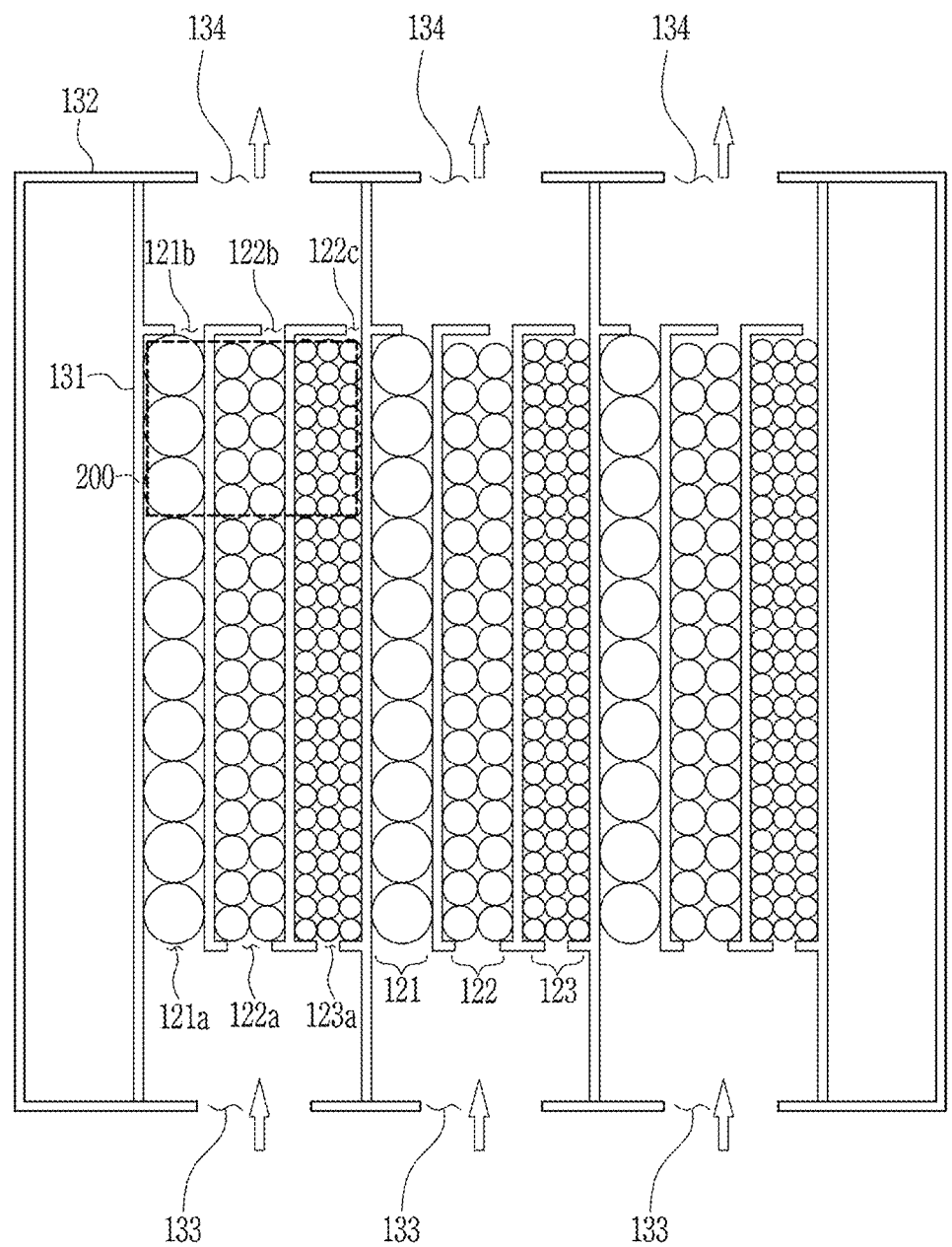
FIG. 16 is a view illustrating the process of disposing the color capsules by using the inlet port in the method of manufacturing the reflective display using the color capsules according to an embodiment of the present disclosure when the inlet port and the outlet port are formed for each unit of a pixel region.

FIG. 16 is a view illustrating the process of disposing the color capsule 110 by using the inlet port 133 in the method of manufacturing the reflective display 100 using the color capsules according to an embodiment of the present disclosure when the inlet port 133 and the outlet port 134 are respectively formed for each unit of the pixel region 200.

In the preparing of the substrate, the inlet port 133 and the outlet port 134 may be respectively formed for each width of the pixel region 200 including the first receiving portion 121, the second receiving portion 122, and the third receiving portion 123. That is, the separating portion 131 extends such that the separating portion 131 is in contact with the outer portion 132 for each width of the pixel region 200, so that the inlet port 133 and the outlet port 134 may be formed for each pixel region 200.

When the inlet port 133 and the outlet port 134 are formed for each pixel region 200, the color capsule 110 can be more easily moved by negative pressure that induces inhalation at the outlet port 134, so that the time to inject the color capsule 110 into the receiving portions 121, 122, 123 may be reduced.

Figure 17:
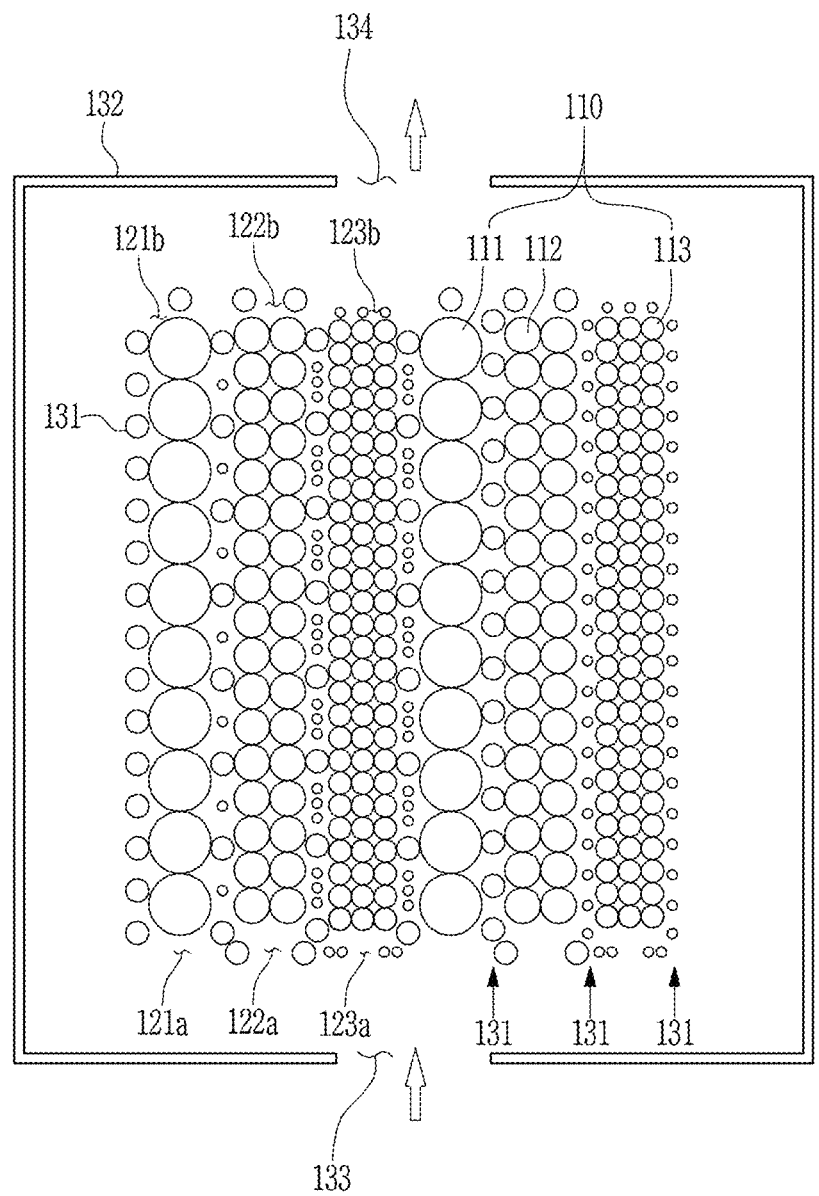
FIG. 17 is a view illustrating the process of disposing the color capsule by using the inlet port in the method of manufacturing the reflective display using the color capsules according to an embodiment of the present disclosure in which the widths of the sub-pixel regions are the same, the separating portion is not provided in the sub-pixel regions and the entrances and the exits are provided in the receiving portion, and the separating portion is formed of the plurality of pillars that is spaced apart from each other.

FIG. 17 is a view illustrating the process of disposing the color capsule 110 by using the inlet port 133 in the method of manufacturing the reflective display 100 using the color capsules according to an embodiment of the present disclosure in which the width of sub-pixel regions are the same, the separating portion 131 is not provided in the sub-pixel regions and the entrances and the exits are provided in the receiving portion, and the separating portion 131 is formed of the plurality of pillars 131p that is spaced apart from each other.

In the preparing of the substrate, the separating portion 131 may be formed of the plurality of pillars 131p disposed at a distance smaller than the diameter of the color capsule 110, and the plurality of pillars 131p may be formed in the cylindrical shape. Further, another distance between the plurality of pillars 131p of the separating portion 131 may be formed to be larger than the diameter of the color capsule 110 such that the entrances 121a, 122a, and 123a are formed. Further, still another distance between the plurality of pillars 131p of the separating portion 131 may be formed to be smaller than the diameter of the color capsule 110 such that the exits 121b, 122b, 123b are formed.

When the separating portion 131 is formed of the plurality of pillars 131p that is spaced apart from each other, pressure may be transferred via the space between the plurality of pillars 131 of the separating portion 131 while the liquid including the color capsule 110 is injected through the inlet port 133 and the negative pressure that induces inhalation at the outlet port 134 during the disposing process of the color capsule. Therefore, the liquid existing between the color capsule 110 may be discharged well to the outlet port 134, and the color capsule 110 may be smoothly inserted into the receiving portion along the liquid.

Figure 18:
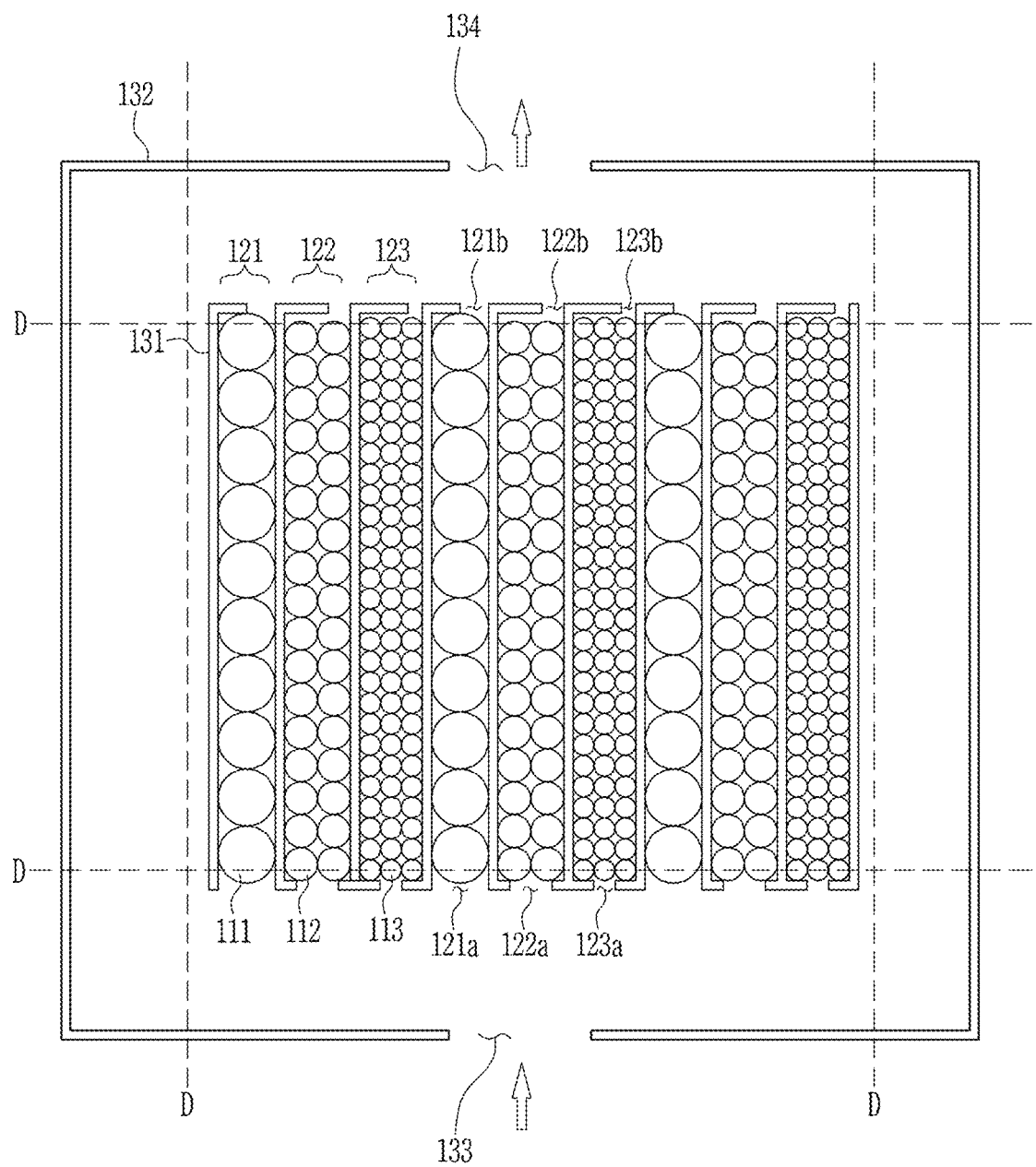
FIG. 18 is a view illustrating a process of removing an outer portion after the color capsules are disposed in the method of manufacturing the reflective display using the color capsules according to an embodiment of the present disclosure.

FIG. 18 is a view illustrating a process of removing the outer portion 132 after the color capsule 110 is disposed in the method of manufacturing the reflective display 100 using the color capsules according to an embodiment of the present disclosure.

After the disposing process of the color capsule is performed with reference to FIGS. 12 to 16, the liquid injected together with the color capsule 110 may be removed and hardened by injecting a binder, or the outer portion 132 that is unnecessary may be removed after the liquid injected together with the color capsule 110 is hardened. A cut line D for removing the outer portion 132 may be positioned such that the entrances and the exits of the receiving portion are removed together. As illustrated in FIGS. 13 to 17, in the manufacturing process, when the separating portion 131 is formed to have the entrances 121a, 122a, 123a having different widths or the exits 121b, 122b, and 123b are formed, the reflective display 100 as illustrated in FIG. 7 may be realized by removing the entrances and the exits along the cut line D. The process of removing the outer portion 132 may not be performed.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the present disclosure.

Further, simple changes and modifications of the present disclosure are appreciated as included in the scope and spirit of the present disclosure, and the protection scope of the present disclosure will be defined by the claims.

What is claimed is:

1. A reflective display using color capsules, the reflective display comprising:
    a plurality of pixels, each of which comprises sub-pixel regions having respective colors;
    a substrate;
    separating portions formed on the substrate and dividing the substrate into a plurality of receiving portions that have respective widths differently according to the respective colors of the sub-pixel regions; and
    the color capsules having respective diameters corresponding to the respective widths of the plurality of receiving portions according to the respective colors of the sub-pixel regions, the color capsules being respectively stored in the plurality of receiving portions, the color capsules comprising particles that have respective colors corresponding to the respective colors of the sub-pixel regions,
    wherein the sub-pixel regions comprise a first sub-pixel region, a second sub-pixel region, and a third sub-pixel region,
    wherein the plurality of receiving portions comprise:
        a first receiving portion having a first width and positioned to correspond to the first sub-pixel region having a first color;
        a second receiving portion having a second width and positioned to correspond to the second sub-pixel region having a second color; and
        a third receiving portion having a third width and positioned to correspond to the third sub-pixel region having a third color,
    wherein the color capsules comprise:
        a first color capsule stored in the first receiving portion and having a first diameter that corresponds to the first width, the first color capsule comprising a particle having the first color;
        a second color capsule stored in the second receiving portion and having a second diameter that corresponds to the second width, the second color capsule comprising a particle having the second color; and
        a third color capsule stored in the third receiving portion and having a third diameter that corresponds to the third width, the third color capsule comprising a particle having the third color,
    wherein the first diameter is greater than the second diameter that is greater than the third diameter, and
    wherein the reflective display further comprises:
        a second spacer disposed between the substrate and the second color capsule to support the second color capsule; and
        a third spacer disposed between the substrate and the third color capsule to support the third color capsule, the third spacer having a height greater than that of the second spacer.

2. The reflective display of claim 1,
    wherein the second spacer is formed on a lower end of the second receiving portion so as to support the second color capsule such that the second color capsule is positioned on an upper side of the second receiving portion; and
    wherein the third spacer is formed on a lower end of the third receiving portion so as to support the third color capsule such that the third color capsule is positioned on an upper side of the third receiving portion.

3. The reflective display of claim 1, wherein the first receiving portion, the second receiving portion, and the third receiving portion are formed in a rectilinear shape and are arranged side by side, and
    wherein the first receiving portion, the second receiving portion, and the third receiving portion are repetitively and sequentially disposed in a width direction of the plurality of receiving portions.

4. The reflective display of claim 1, wherein each width of the sub-pixel regions is the same,
    wherein the first receiving portion, the second receiving portion, and the third receiving portion are formed in a rectilinear shape and are arranged side by side,
    wherein the first width corresponds to the first sub-pixel region,
    wherein the second sub-pixel region lies over at least two second receiving portions, and the second width is smaller than the first width,
    wherein the third sub-pixel region lies over at least three third receiving portions, and the third width is smaller than the second width, and
    wherein the first receiving portion, the at least two second receiving portions, and the at least three third receiving portions are repetitively and sequentially disposed in a width direction of the plurality of receiving portions.

5. The reflective display of claim 1, wherein the first receiving portion, the second receiving portion, and the third receiving portion are formed in a zigzag shape and are arranged side by side, and the first receiving portion, the second receiving portion, and the third receiving portion are repetitively and sequentially disposed in a width direction of the plurality of receiving portions.

6. The reflective display of claim 1, wherein the first receiving portion, the second receiving portion, and the third receiving portion are formed in a lattice shape in which a length thereof is a multiple of a width thereof, wherein the first receiving portion, the second receiving portion, and the third receiving portion are repetitively and sequentially disposed in a width direction of the plurality of receiving portions, wherein the first receiving portion comprises a plurality of first sub-receiving portions disposed in a length direction of the first receiving portion, wherein the second receiving portion comprises a plurality of second sub-receiving portions disposed in a length direction of the second receiving portion, and wherein the third receiving portion comprises a plurality of third sub-receiving portions disposed in a length direction of the third receiving portion.

7. The reflective display of claim 1, wherein the separating portions comprise a plurality of pillars disposed at a distance smaller than the respective diameters of the color capsules.

\* \* \* \* \*